US012786880B2

(12) United States Patent
Shrestha et al.

(10) Patent No.: US 12,786,880 B2
(45) Date of Patent: Nov. 3, 2026

(54) LOCATION BASED WAKE UP SIGNAL

(71) Applicant: QUALCOMM INCORPORATED, San Diego, CA (US)

(72) Inventors: Bharat Shrestha, San Diego, CA (US); Mungal Singh Dhanda, Slough (GB); Umesh Phuyal, San Diego, CA (US); Luis Fernando Brisson Lopes, Swindon (GB); Haris Zisimopoulos, London (GB)

(73) Assignee: QUALCOMM Incorporated, San Diego, CA (US)

(*) Notice: Subject to any disclaimer, the term of this patent is extended or adjusted under 35 U.S.C. 154(b) by 274 days.

(21) Appl. No.: 18/686,282

(22) PCT Filed: Sep. 14, 2022

(86) PCT No.: PCT/US2022/043461
§ 371 (c)(1),
(2) Date: Feb. 23, 2024

(87) PCT Pub. No.: WO2023/069205
PCT Pub. Date: Apr. 27, 2023

(65) Prior Publication Data

US 2024/0373361 A1 Nov. 7, 2024

(30) Foreign Application Priority Data

Oct. 21, 2021 (GR) .............................. 20210100721

(51) Int. Cl.

| | |
|---|---|
| ***H04W 72/02*** | (2009.01) |
| ***H04W 52/02*** | (2009.01) |
| ***H04W 64/00*** | (2009.01) |

(52) U.S. Cl.
CPC ..... *H04W 52/0235* (2013.01); *H04W 64/006* (2013.01); *H04W 72/02* (2013.01)

(58) Field of Classification Search
CPC ........... H04W 52/0235; H04W 64/006; H04W 72/02
See application file for complete search history.

(56) References Cited

U.S. PATENT DOCUMENTS

| | | | | |
|---|---|---|---|---|
| 2018/0255515 | A1* | 9/2018 | Gupta Hyde | H04W 52/0235 |
| 2018/0270756 | A1* | 9/2018 | Bhattad | H04W 76/27 |

(Continued)

OTHER PUBLICATIONS

CMCC: "Discussion on Support of Non Continuous Coverage", 3GPP TSG-RAN WG2 Meeting #115-e, R2-2108500, 3rd Generation Partnership Project, Mobile Competence Centre, 650, Route Des Lucioles, F-06921 Sophia-Antipolis Cedex, France, vol. RAN WG2, No. Electronic Meeting, Aug. 16, 2021-Aug. 27, 2021 Aug. 6, 2021, XP052034840, 4 Pages, Section 2, Figure 1.

(Continued)

*Primary Examiner* — Abdelnabi O Musa
(74) *Attorney, Agent, or Firm* — Holland & Hart LLP/Qualcomm

(57) ABSTRACT

Methods, systems, and devices for wireless communications are described. A user equipment (UE) may monitor for wake up signals (WUSs) from a network entity (e.g., satellite) of a non-terrestrial network based on a geographic area. For example, the UE may monitor for WUSs if the UE is within a geographic area. In other examples, a UE may monitor for WUSs according to an assigned location-based WUS group if a cell supports the WUS group. In some cases, a network entity or UE may select a WUS resource set based on a location parameter. In some cases, a network entity or UE may select a WUS group based on a location parameter. In some cases, one or more network entities may determine geographic areas where the network may use WUSs or WUS groups, or the one or more network entities may negotiate with the UE to determine such areas.

30 Claims, 18 Drawing Sheets

(56) References Cited

U.S. PATENT DOCUMENTS

| | | | | |
|---|---|---|---|---|
| 2019/0090191 | A1* | 3/2019 | Liu | H04W 4/08 |
| 2019/0287377 | A1* | 9/2019 | Gillum | G01S 19/17 |
| 2022/0078879 | A1* | 3/2022 | Nimbalker | H04W 52/0216 |
| 2022/0225274 | A1* | 7/2022 | Wang | H04W 52/0235 |
| 2023/0043789 | A1* | 2/2023 | Maleki | H04W 76/28 |
| 2024/0064735 | A1* | 2/2024 | Atungsiri | H04B 7/18513 |
| 2024/0276452 | A1* | 8/2024 | Selvaganapathy | H04W 68/02 |
| 2025/0039788 | A1* | 1/2025 | Yang | H04W 52/0216 |

OTHER PUBLICATIONS

International Search Report and Written Opinion—PCT/US2022/043461—ISA/EPO—Dec. 15, 2022.

Nokia et al., "Discussion on Open Issues not Covered by NR NTN," 3GPP TSG-RAN WG2 Meeting #114 Electronic, R2-2105416, 3rd Generation Partnership Project, Mobile Competence Centre, 650, Route Des Lucioles, F-06921 Sophia-Antipolis Cedex, France, vol. RAN WG2, No. Electronic, May 19, 2021-May 27, 2021, May 11, 2021, XP052007023, 5 Pages.

Nokia et al., "On Paging and Idle Mode Cell Reselection Enhancements for IoT-NTN," 3GPP TSG-RAN WG2 Meeting #115 Electronic, R2-2107814, 3rd Generation Partnership Project, Mobile Competence Centre, 650, Route Des Lucioles, F-06921 Sophia-Antipolis Cedex, France, vol. RAN WG2, No. Electronic, Aug. 16, 2021-Aug. 27, 2021, Aug. 6, 2021, XP052034426, 10 Pages.

Xiaomi: "Essential Functionality Related to Power Saving & Mobility," 3GPP TSG-RAN2 Meeting #114e, R2-2106359, 3rd Generation Partnership Project, Mobile Competence Centre, 650, Route Des Lucioles, F-06921 Sophia-Antipolis Cedex, France, vol. RAN WG2, No. Online, May 19, 2021-May 27, 2021, May 11, 2021, XP052007713, 3 Pages.

ZTE Corporation et al., "SIB and IoT Features Applicability for IoT Over NTN," 3GPP TSG-RAN WG2 Meeting #113bis-e, R2-2103357, 3rd Generation Partnership Project, Mobile Competence Centre, 650, Route Des Lucioles, F-06921 Sophia-Antipolis Cedex, France, vol. RAN WG2, No. Online, Apr. 12, 2021-Apr. 20, 2021, Apr. 2, 2021, XP052174927, 8 Pages, 2.1-2.4.

* cited by examiner

LOCATION BASED WAKE UP SIGNAL

CROSS REFERENCE

The present Application is a 371 national stage filing of International PCT Application No. PCT/US2022/043461 by Shrestha et al. entitled "LOCATION BASED WAKE UP SIGNAL," filed Sep. 14, 2022; and claims priority to International Patent Application No. 20210100721 by Shrestha et al. entitled "LOCATION BASED WAKE UP SIGNAL," filed Oct. 21, 2021, each of which is assigned to the assignee hereof, and each of which is expressly incorporated by reference in its entirety herein.

FIELD OF TECHNOLOGY

The following relates to wireless communications, including a location based wake up signal (WUS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may monitor for a wake up signal (WUS). However, WUSs that may be unintended for the UE may cause the UE to wake up. In some network scenarios, cells may be changing (e.g., due to moving satellites) with respect to the UE, and thus the UE may be unable to receive or monitor for a WUS.

SUMMARY

The described techniques relate to improved techniques, devices, and apparatuses that support network-assisted positioning for sidelink communications. The described techniques may enable a user equipment (UE) to monitor and receive wake up signals (WUSs) from a satellite based on a geographic area of the UE, the satellite, or both. For example, the UE may use (e.g., monitor, receive) WUSs if the UE is within a geographic area (e.g., within a radius of a reference location) even if a cell keeps changing (e.g., satellites keep moving). The geographic area may be fixed relative to locations on a surface of the earth (e.g., the geographic areas are terrestrial-based). In some other examples, a network device (e.g., a satellite) may assign the UE a WUS group (e.g., WUS group identity) based on a last determined position of the UE, and the UE may monitor for WUSs in the cell if the assigned WUS group at the UE and a supported or enabled WUS group (e.g., WUS group identity) by the cell match.

In some cases, the network (e.g., via a base station, a satellite, or both) may select a WUS resource set for a WUS based on a location or an area-specific factor (e.g., geographic area) of the UE or based on an area ID configured to the UE. In some cases, the network (e.g., via a base station, a satellite) may select (e.g., assign) a WUS group (e.g., WUS group identity) for the UE based on an identifier (ID) associated with a geographic area. The network (e.g., via a base station, a satellite) may configure an area ID to the UE, and the UE may determine which WUS group to monitor based on the area ID of the UE. In some cases, the network (e.g., via a base station, a satellite, one or more devices of a radio access network (RAN), one or more devices of a core network) may determine geographic areas where the network may use WUSs or WUS groups (e.g., based on coordinates, registration areas (e.g., WUS registration areas), tracking area codes (TACs), virtual cell IDs, zone IDs, geo-fencing parameters), or the network may negotiate with the UE to determine such areas. Based on (e.g., after) determining a geographic area where the network may use some WUSs or WUS groups, the network (e.g., a base station, a satellite) may assign a WUS group (e.g., WUS group identity) to the UE.

A method for wireless communications at a UE is described. The method may include receiving, from a first network entity of an NTN, a first message indicating a location parameter associated with a WUS configuration, determining that the UE is located within a geographic area associated with the location parameter based on the receiving of the first message, and monitoring for a first WUS from the first network entity based on the determining that the UE is located within the geographic area.

An apparatus for wireless communications at a UE is described. The apparatus may include a processor, memory coupled with the processor, and instructions stored in the memory. The instructions may be executable by the processor to cause the apparatus to receive, from a first network entity of an NTN, a first message indicating a location parameter associated with a WUS configuration, determine that the UE is located within a geographic area associated with the location parameter based on the receiving of the first message, and monitor for a first WUS from the first network entity based on the determining that the UE is located within the geographic area.

Another apparatus for wireless communications at a UE is described. The apparatus may include means for receiving, from a first network entity of an NTN, a first message indicating a location parameter associated with a WUS configuration, means for determining that the UE is located within a geographic area associated with the location parameter based on the receiving of the first message, and means for monitoring for a first WUS from the first network entity based on the determining that the UE is located within the geographic area.

A non-transitory computer-readable medium storing code for wireless communications at a UE is described. The code may include instructions executable by a processor to receive, from a first network entity of an NTN, a first message indicating a location parameter associated with a WUS configuration, determine that the UE is located within a geographic area associated with the location parameter based on the receiving of the first message, and monitor for a first WUS from the first network entity based on the determining that the UE is located within the geographic area.

Some examples of the method, apparatuses, and non-transitory computer-readable medium described herein may further include operations, features, means, or instructions for monitoring for a second WUS from a second network entity of the NTN based on the determining that the UE may be located within the geographic area.

Some examples of the method, apparatuses, and non-transitory computer-readable medium described herein may further include operations, features, means, or instructions for determining that the UE may be located outside of the geographic area after monitoring for the first WUS and refraining from monitoring for a second instance of the first WUS based on the determining that the UE may be located outside of the geographic area.

In some examples of the method, apparatuses, and non-transitory computer-readable medium described herein, the location parameter includes a cell identifier, a reference location associated with the geographic area, a radius, or any combination thereof.

In some examples of the method, apparatuses, and non-transitory computer-readable medium described herein, the determining that the UE may be located within the geographic area associated with the location parameter may include operations, features, means, or instructions for determining that the UE may be located within a radius distance from a reference location.

Some examples of the method, apparatuses, and non-transitory computer-readable medium described herein may further include operations, features, means, or instructions for receiving, from the first network entity, a selection parameter that corresponds to the geographic area and indicates a set of resources used by the first WUS, the WUS configuration including the set of resources and determining to use the set of resources based on the selection parameter, where the monitoring for the first WUS may be based on the set of resources.

Some examples of the method, apparatuses, and non-transitory computer-readable medium described herein may further include operations, features, means, or instructions for receiving, from the first network entity, a selection parameter that corresponds to the geographic area and indicates a signal group identity used by the first WUS and determining to use the signal group identity based on the selection parameter, where the monitoring for the first WUS may be based on the signal group identity.

In some examples of the method, apparatuses, and non-transitory computer-readable medium described herein, the geographic area associated with the location parameter for the first WUS may be defined by one or more WUS registration areas, one or more global navigation satellite system (GNSS) coordinates, one or more TACs, one or more virtual cell IDs, one or more zone IDs, one or more geo-fencing parameters, or any combination thereof.

In some examples of the method, apparatuses, and non-transitory computer-readable medium described herein, the one or more WUS registration areas each include one or more second TACs, or one or more second virtual cell IDs, one or more second zone IDs, one more second cell identities, or any combination thereof.

Some examples of the method, apparatuses, and non-transitory computer-readable medium described herein may further include operations, features, means, or instructions for transmitting, to a network device of a network, a second message indicating one or more preferences for the geographic area associated with the first WUS, a capability to use the geographic area associated with the first WUS, location information, or any combination thereof, where the network includes the NTN, and where the receiving of the first message indicating the location parameter associated with the WUS configuration may be based on the transmitting of the second message.

In some examples of the method, apparatuses, and non-transitory computer-readable medium described herein, the second message includes a non-access stratum (NAS) message or a radio resource control (RRC) message.

In some examples of the method, apparatuses, and non-transitory computer-readable medium described herein, the first message includes an RRC message.

In some examples of the method, apparatuses, and non-transitory computer-readable medium described herein, the first network entity includes a first cell.

A method for wireless communications at a network entity of an NTN is described. The method may include transmitting, to a UE, a first message indicating a location parameter associated with a WUS configuration and transmitting, to the UE, a WUS that corresponds to the location parameter.

An apparatus for wireless communications at a network entity of an NTN is described. The apparatus may include a processor, memory coupled with the processor, and instructions stored in the memory. The instructions may be executable by the processor to cause the apparatus to transmit, to a UE, a first message indicating a location parameter associated with a WUS configuration and transmit, to the UE, a WUS that corresponds to the location parameter.

Another apparatus for wireless communications at a network entity of an NTN is described. The apparatus may include means for transmitting, to a UE, a first message indicating a location parameter associated with a WUS configuration and means for transmitting, to the UE, a WUS that corresponds to the location parameter.

A non-transitory computer-readable medium storing code for wireless communications at a network entity of an NTN is described. The code may include instructions executable by a processor to transmit, to a UE, a first message indicating a location parameter associated with a WUS configuration and transmit, to the UE, a WUS that corresponds to the location parameter.

In some examples of the method, apparatuses, and non-transitory computer-readable medium described herein, the location parameter includes a cell identifier, a reference location associated with a geographic area, a radius, or any combination thereof.

Some examples of the method, apparatuses, and non-transitory computer-readable medium described herein may further include operations, features, means, or instructions for determining a geographic area associated with the WUS and associated with the location parameter, where the geographic area may be defined by one or more WUS registration areas, one or more GNSS coordinates, one or more TACs, one or more virtual cell IDs, one or more zone IDs, one or more geo-fencing parameters, or any combination thereof.

In some examples of the method, apparatuses, and non-transitory computer-readable medium described herein, the one or more WUS registration areas each include one or more second TACs, or one or more second virtual cell IDs, one or more second zone IDs, one more second cell identities, or any combination thereof.

Some examples of the method, apparatuses, and non-transitory computer-readable medium described herein may further include operations, features, means, or instructions for transmitting, to the UE, a selection parameter that corresponds to a geographic area associated with the location parameter and that indicates a set of resources used by the WUS, the WUS configuration including the set of resources.

Some examples of the method, apparatuses, and non-transitory computer-readable medium described herein may further include operations, features, means, or instructions for transmitting, to the UE, a selection parameter that corresponds to a geographic area associated with the location parameter and that indicates a signal group identity used by the WUS.

Some examples of the method, apparatuses, and non-transitory computer-readable medium described herein may further include operations, features, means, or instructions for receiving, from the UE, a second message indicating one or more preferences for a geographic area associated with the WUS and associated with the location parameter, a capability to use the geographic area, location information, or any combination thereof, where the transmitting of the first message indicating the location parameter associated with the WUS configuration may be based on the receiving of the second message.

In some examples of the method, apparatuses, and non-transitory computer-readable medium described herein, the second message includes a NAS message or an RRC message.

In some examples of the method, apparatuses, and non-transitory computer-readable medium described herein, the first message includes an RRC message.

A method for wireless communications at a UE is described. The method may include receiving, from a first network entity of an NTN, a first message indicating a first WUS configuration that indicates that the UE is assigned a WUS group identity, where the WUS group identity is associated with a geographic area and monitoring for a first WUS from the first network entity based on the WUS group identity included in the first message, where a first WUS group corresponds to the first WUS configuration.

An apparatus for wireless communications at a UE is described. The apparatus may include a processor, memory coupled with the processor, and instructions stored in the memory. The instructions may be executable by the processor to cause the apparatus to receive, from a first network entity of an NTN, a first message indicating a first WUS configuration that indicates that the UE is assigned a WUS group identity, where the WUS group identity is associated with a geographic area and monitor for a first WUS from the first network entity based on the WUS group identity included in the first message, where a first WUS group corresponds to the first WUS configuration.

Another apparatus for wireless communications at a UE is described. The apparatus may include means for receiving, from a first network entity of an NTN, a first message indicating a first WUS configuration that indicates that the UE is assigned a WUS group identity, where the WUS group identity is associated with a geographic area and means for monitoring for a first WUS from the first network entity based on the WUS group identity included in the first message, where a first WUS group corresponds to the first WUS configuration.

A non-transitory computer-readable medium storing code for wireless communications at a UE is described. The code may include instructions executable by a processor to receive, from a first network entity of an NTN, a first message indicating a first WUS configuration that indicates that the UE is assigned a WUS group identity, where the WUS group identity is associated with a geographic area and monitor for a first WUS from the first network entity based on the WUS group identity included in the first message, where a first WUS group corresponds to the first WUS configuration.

Some examples of the method, apparatuses, and non-transitory computer-readable medium described herein may further include operations, features, means, or instructions for receiving, from the first network entity, a second message indicating that the first network entity uses the first WUS group to alert UEs in the geographic area, where the monitoring for the first WUS may be based on the receiving the second message, where the second message may be received in a broadcast message.

In some examples of the method, apparatuses, and non-transitory computer-readable medium described herein, the first message includes an NAS message or an RRC message.

Some examples of the method, apparatuses, and non-transitory computer-readable medium described herein may further include operations, features, means, or instructions for receiving, from a second network entity of the NTN, a second message indicating that the second network entity uses the first WUS configuration to alert UEs and monitoring for a second WUS group identity from the second network entity based on the first WUS configuration included in the second message, where the second WUS group identity corresponds to the first WUS configuration.

Some examples of the method, apparatuses, and non-transitory computer-readable medium described herein may further include operations, features, means, or instructions for monitoring for a second WUS from the first network entity based on a second WUS configuration that may be independent of the geographic area.

Some examples of the method, apparatuses, and non-transitory computer-readable medium described herein may further include operations, features, means, or instructions for receiving, from the first network entity, a selection parameter that corresponds to the geographic area and indicates a set of resources used by the first WUS, the first WUS configuration including the set of resources and determining to use the set of resources based on the selection parameter, where the monitoring for the first WUS may be based on the set of resources.

Some examples of the method, apparatuses, and non-transitory computer-readable medium described herein may further include operations, features, means, or instructions for receiving, from the first network entity, a selection parameter that corresponds to the geographic area and indicates a signal group identity used by the first WUS and determining to use the signal group identity based on the selection parameter, where the monitoring for the first WUS may be based on the signal group identity.

In some examples of the method, apparatuses, and non-transitory computer-readable medium described herein, the geographic area associated with the first WUS may be defined by one or more WUS registration areas, one or more GNSS coordinates, one or more TACs, one or more virtual cell IDs, one or more zone IDs, one or more geo-fencing parameters, or any combination thereof.

In some examples of the method, apparatuses, and non-transitory computer-readable medium described herein, the one or more WUS registration areas each include one or more second TACs, or one or more second virtual cell IDs, one or more second zone IDs, one more second cell identities, or any combination thereof.

Some examples of the method, apparatuses, and non-transitory computer-readable medium described herein may further include operations, features, means, or instructions for transmitting, to a network device of a network, a second message indicating one or more preferences for the geographic area associated with the first WUS, a capability to use the geographic area associated with the first WUS, location information, or any combination thereof, where the network includes the NTN, and where the receiving of the first message indicating that the UE may be assigned the first WUS configuration that corresponds to the geographic area may be based on the transmitting of the second message.

In some examples of the method, apparatuses, and non-transitory computer-readable medium described herein, the second message includes an NAS message or an RRC message.

A method for wireless communications at a network entity of an NTN is described. The method may include transmitting, to a UE, a first message indicating a first WUS configuration that indicates that the UE is assigned a WUS group identity, where the WUS group identity is associated with a geographic area and transmitting, to the UE, a first WUS to alert the UE of a mobile terminated paging call, where a first WUS group corresponds to the first WUS configuration.

An apparatus for wireless communications at a network entity of an NTN is described. The apparatus may include a processor, memory coupled with the processor, and instructions stored in the memory. The instructions may be executable by the processor to cause the apparatus to transmit, to a UE, a first message indicating a first WUS configuration that indicates that the UE is assigned a WUS group identity, where the WUS group identity is associated with a geographic area and transmit, to the UE, a first WUS to alert the UE of a mobile terminated paging call, where a first WUS group corresponds to the first WUS configuration.

Another apparatus for wireless communications at a network entity of an NTN is described. The apparatus may include means for transmitting, to a UE, a first message indicating a first WUS configuration that indicates that the UE is assigned a WUS group identity, where the WUS group identity is associated with a geographic area and means for transmitting, to the UE, a first WUS to alert the UE of a mobile terminated paging call, where a first WUS group corresponds to the first WUS configuration.

A non-transitory computer-readable medium storing code for wireless communications at a network entity of an NTN is described. The code may include instructions executable by a processor to transmit, to a UE, a first message indicating a first WUS configuration that indicates that the UE is assigned a WUS group identity, where the WUS group identity is associated with a geographic area and transmit, to the UE, a first WUS to alert the UE of a mobile terminated paging call, where a first WUS group corresponds to the first WUS configuration.

Some examples of the method, apparatuses, and non-transitory computer-readable medium described herein may further include operations, features, means, or instructions for transmitting, to the UE, a second message indicating that the network entity uses the first WUS group to alert UEs in the geographic area, where the second message may be transmitted in a broadcast message.

In some examples of the method, apparatuses, and non-transitory computer-readable medium described herein, the transmitting the second message indicating that the network entity uses the first WUS configuration to alert UEs in the geographic area may be based on the network entity being located above the geographic area.

Some examples of the method, apparatuses, and non-transitory computer-readable medium described herein may further include operations, features, means, or instructions for transmitting, to the UE, a second WUS corresponding to a second WUS configuration that may be independent of the geographic area or that may be common for all UEs.

Some examples of the method, apparatuses, and non-transitory computer-readable medium described herein may further include operations, features, means, or instructions for transmitting, to the UE, a first selection parameter that indicates a set of resources used by the first WUS, a second selection parameter that indicates a signal group identity used by the first WUS, or both, the first selection parameter and the second selection parameter corresponding to the geographic area.

Some examples of the method, apparatuses, and non-transitory computer-readable medium described herein may further include operations, features, means, or instructions for determining the geographic area associated with the first WUS, where the geographic area associated with the first WUS may be defined by one or more WUS registration areas, one or more GNSS coordinates, one or more TACs, one or more virtual cell IDs, one or more zone IDs, one or more geo-fencing parameters, or any combination thereof.

In some examples of the method, apparatuses, and non-transitory computer-readable medium described herein, the one or more WUS registration areas each include one or more second TACs, or one or more second virtual cell IDs, one or more second zone IDs, one more second cell identities, or any combination thereof.

Some examples of the method, apparatuses, and non-transitory computer-readable medium described herein may further include operations, features, means, or instructions for receiving, from the UE, a second message indicating one or more preferences for the geographic area associated with the first WUS, a capability to use the geographic area associated with the first WUS, location information, or any combination thereof, and where the transmitting of the first message indicating that the UE may be assigned the first WUS configuration that corresponds to the geographic area may be based on the receiving of the second message.

In some examples of the method, apparatuses, and non-transitory computer-readable medium described herein, the second message includes an NAS message or an RRC message.

In some examples of the method, apparatuses, and non-transitory computer-readable medium described herein, the first message includes an NAS message or an RRC message.

Some examples of the method, apparatuses, and non-transitory computer-readable medium described herein may further include operations, features, means, or instructions for reserving one or more second WUS groups based on the transmitting the first message.

DETAILED DESCRIPTION

Figure 1:
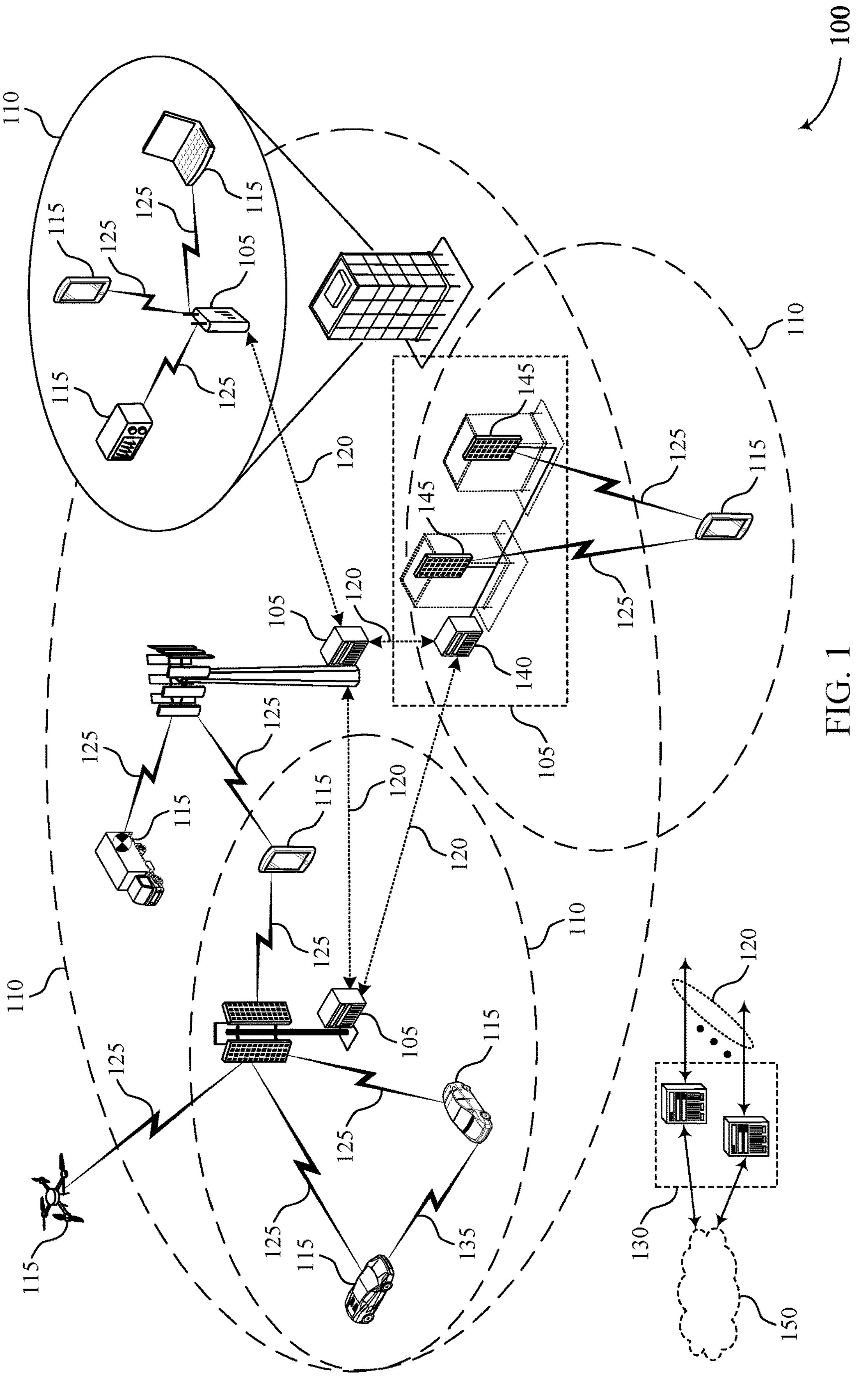
FIG. 1 illustrates an example of a wireless communications system that supports location based wake up signal (WUS) in accordance with aspects of the present disclosure.

To conserve power, a user equipment (UE) in a wireless communications system may enter a power-saving mode. In such modes, the UE may deactivate one or more components (including one or more antennas and supporting components) for a duration of time. If the network receives communications or information intended by the UE during one of the low-power durations, the network may desire a way to cause the UE to wake-up and receive the information. In some wireless communications systems (such as a non-terrestrial network), the UE may receive a wake up signal (WUS) from a network entity or cell (e.g., a satellite) to indicate to the UE to monitor for a paging message. In some cases, WUSs may be beneficial for low-power UEs, stationary UEs, low-mobility UEs, or any combination thereof. The UE may be able to receive the WUS while in an idle state, and thus may be able to conserve power and monitor for incoming signaling.

To mitigate receiving a WUS that may be intended for another UE (e.g., to prevent unintentional UE wake up), the UE may transmit a message indicating a last used cell ID for the UE, and one or more network entities may broadcast WUS on the cell that matches the last used cell ID. In this way, the UE may not activate one or more components based on receiving WUSs from other cells or intended for other UEs, and may receive WUSs from the last used cell. However, in non-terrestrial networks (NTNs), satellites (e.g., that may be in low Earth orbit (LEO)) and corresponding cells may be moving relative to the UE, and thus the cell may be changing for the UE even when the UE may be remaining stationary (relative to the Earth or other terrestrial landmark or reference point) or may be low mobility. In such cases, the UE may not be able to receive WUSs due to cell changes (e.g., the last used cell ID would not match with subsequent cells for subsequent satellites), even though the UE may be remaining stationary or may have relatively low mobility.

To enable a UE (e.g., a stationary or low mobility UE) to receive WUSs from satellites in NTN LEO scenarios, the UE may be able to receive WUSs based on the location (e.g., geographic area) of the UE, the satellite, or both (e.g., rather than based on its last used cell ID, or based on some other aspect). For example, if the UE is within a radius of a reference location (e.g., the UE may be considered to be stationary or low mobility if the UE is within the radius of a terrestrial-based reference location), the UE may continue to receive WUSs even if a cell may change (e.g., due to moving satellites). In some other examples, a network (e.g., via a network entity, a satellite) may assign the UE a WUS group (e.g., WUS group identity) (e.g., a WUS configuration, a signal type, a signal group identity) based on a last determined location of the UE. The UE may monitor for WUSs if a satellite (e.g., corresponding to a cell) broadcasts support for the WUS group (e.g., the satellite broadcasts that the satellite uses the WUS group (e.g., WUS group identity) to alert UEs in the geographic area).

In some cases, the network (e.g., via a network entity, a satellite) may select a WUS resource set based on a location or an area-specific factor (e.g., geographic area) of the UE. In some cases, the network (e.g., via a network entity, a satellite) may select (e.g., assign) a WUS group for the UE based on an area ID. The network may configure an area ID to the UE, and the UE may determine which WUS group to monitor based on the UE area ID. In some cases, the network (e.g., via a network entity, a satellite, one or more devices of a radio access network (RAN), one or more devices of a core network) may determine geographic areas where the network may use WUSs or WUS groups (e.g., based on coordinates, registration areas, tracking area codes (TACs), virtual cell IDs, zone IDs, geo-fencing parameters), or the network may negotiate with the UE to determine such areas. Based on (e.g., after) determining a geographic area where the network may use some WUSs or WUS groups, the network (e.g., a network entity, satellite) may assign a WUS group (e.g., WUS group identity) to the UE. By using a geographic area of the UE, the satellite, or both, the UE may be able to monitor and receive WUSs where a cell may be changing relative to the UE (e.g., due to moving satellites in LEO scenarios).

Aspects of the disclosure are initially described in the context of wireless communications systems. Aspects of the disclosure are further illustrated by and described with reference to process flows, apparatus diagrams, system diagrams, and flowcharts that relate to location based WUS.

FIG. 1 illustrates an example of a wireless communications system 100 that supports location based WUS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

According to the techniques described herein, a UE 115 may monitor and receive WUSs from one or more satellites (e.g., which may function as base stations 105 in some cases) based on a geographic area of the UE 115, the satellites, or both. For example, a UE 115 may use (e.g., monitor, receive) WUSs if the UE 115 is within a geographic area (e.g., within a radius of a reference location) even if a cell keeps changing (e.g., satellites keep moving). In some other examples, a network device (e.g., a satellite) may assign the UE 115 a WUS group (e.g., WUS group identity) based on a last determined position of the UE 115, and the UE 115 may monitor for WUSs in the cell if the assigned WUS group (e.g., WUS group identity) at the UE 115 and a supported or enabled WUS group (e.g., WUS group identity) by the cell match.

In some cases, the network (e.g., via a base station 105, a satellite) may select a WUS resource set for a WUS based on a location or an area specific factor (e.g., geographic area) of the UE 115 or based on an area ID configured to the UE. In some cases, the network (e.g., via a base station 105, a satellite) may select (e.g., assign) a WUS group (e.g., WUS group identity) for the UE 115 based on an area ID. The network (e.g., via a base station 105, a satellite) may configure an area ID to the UE 115, and the UE 115 may determine which WUS group (e.g., WUS group identity) in the given WUS resource set to monitor based on the area ID of the UE 115. In some cases, the network (e.g., via a base station 105, a satellite, one or more devices of a RAN, one or more devices of a core network) may determine geographic areas where the network may use WUSs or WUS groups (e.g., based on coordinates, registration areas, TACs, virtual cell IDs, zone IDs, geo-fencing parameters), or the network may negotiate with the UE 115 to determine such areas. Based on (e.g., after) determining a geographic area where the network may use some WUSs or WUS groups, the network (e.g., a base station 105, a satellite) may assign a WUS group (e.g., WUS group identity) to the UE 115.

Figure 2:
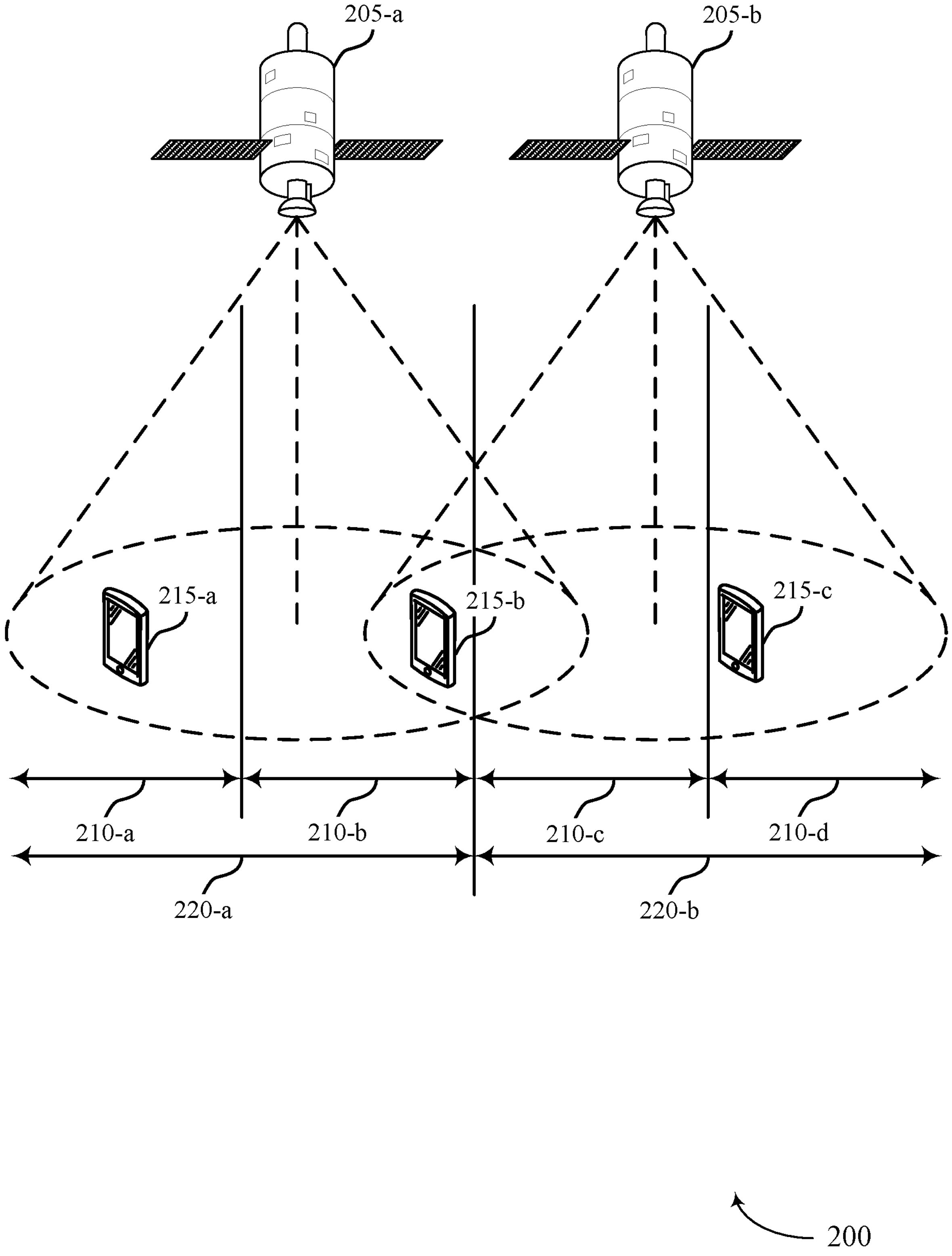
FIG. 2 illustrates an example of a wireless communications system that supports location based WUS in accordance with aspects of the present disclosure.

FIG. 2 illustrates an example of a wireless communications system 200 that supports location based WUS in accordance with aspects of the present disclosure. The wireless communications system 200 may implement or be implemented by aspects of the wireless communications system 100 as described with reference to FIG. 1. For example, the wireless communications system 200 may include UEs 215 and satellites 205, which may be examples of UEs 115 and base stations 105, or any other devices, as described herein. The wireless communications system 200 may support improvements to interference, processing, power consumption, and more efficient utilization of communication resources, among other benefits. In some examples, satellite 205-*a*, satellite 205-*b*, or both, may communicate with UE 215-*a*, UE 215-*b*, UE 215-*c*, or any combination thereof. Techniques described herein with reference to any one or more of UEs 215 or satellites 205 may apply similarly to the other UEs 215 or the other satellite 205, respectively.

In wireless communications system 200, UEs 215 may be in an idle state and monitor for WUSs, which may save power at the UE 215. When not monitoring for WUSs, UEs 215 may monitor for control signaling (e.g., physical downlink control channel (PDCCH) signaling). WUSs may therefore be beneficial for low-power UEs, stationary UEs, low-mobility UEs, or any combination of thereof. In some cases, a UE 215 may monitor for or receive a WUS for a configured maximum WUS duration, and may receive a WUS during the duration. Upon receiving a WUS, a UE 215 may wake up from the idle state. In some cases (e.g., after, or directly after the configured maximum WUS duration), the UE 215 may wait for a gap time duration before monitoring for paging messages (e.g., during a paging occasion (PO) (e.g., after or directly after the gap time duration)).

In wireless communications system 200, UE 215-*b* (e.g., or UE 215-*a*, UE 215-*c*, or any combination thereof) may monitor for WUSs based on (e.g., before) a PO (e.g., which may be a time duration) if WUS is enabled in a cell corresponding to a base station. However, UE 215-*b* may receive WUSs from other base stations for paging messages intended for other UEs 215, which may unintentionally wake up UE 215-*b*. To reduce wake up of UEs 215 as a result of paging intended for other UEs 215, a cell (e.g., corresponding to a base station) may use paging with a group WUS (GWUS) if UE 215-*b* recently entered an idle mode (e.g., RRC_IDLE) in the cell. The base station corresponding to the cell may determine that UE 215-*b* recently entered the idle mode in the cell based on one or more triggers. For example, the base station may determine that UE 215-*b* recently entered the idle mode in the cell if the base station receives a message including RRCEarlyDataComplete, a message including RRCConnectionRelease (e.g., and not including noLastCellUpdate), a message including RRCConnectionRelease, including noLastCellUpdate, where UE 215-*b* may have been using GWUS in the cell prior to an RRC connection attempt, or any combination thereof.

In some cases, to reduce WUS use in cells not monitored by UE 215-*b*, a WUS-capable next generation eNB (ng-eNB) may provide last used cell information for UE 215-*b* to an MME, AMF, or both, in an S1 application protocol (S1-AP), next generation application protocol (NG-AP), or both; UE Context Release Complete message, UE Context Suspend Request message, or both; for one or more (e.g., all) UEs 215. That is, it may not be beneficial for a network to transmit WUS in a cell where a UE 215 is not camped in. In an S1-AP paging message, UE 215-*b* may send a last used cell ID in an Assistance Data for Recommended Cells information element (IE) to an eNB. When the eNB receives the S1-AP paging message from UE 215-*b* (e.g., which may be a WUS-capable UE) that also includes the Assistance Data for Recommended Cells IE, the eNB may broadcast (e.g., only broadcast) a WUS on a cell that matches the last used cell ID. However, in NTN LEO scenarios, a satellite may be moving, and a cell (e.g., corresponding to the satellite) may change with respect to UE 215-*b* (e.g., which may be stationary or low mobility). In such cases, UE 215-*b* may not use (e.g., monitor, receive) WUSs based on the cell change. Thus, in NTN LEO scenarios, UE 215-*b* may not be able to receive WUS from various moving satellites.

In some NTNs, such as in wireless communications system 200, an eNB may generate or use a cell global identity or identification (CGI) (e.g., which may be a type of cell ID) that identifies the eNB, a corresponding cell for the eNB, or both, and the CGI may correspond to a geographic area (e.g., a geographic area of UE 215-*b*). That is, the CGI and the geographic area may be mapped. In some cases, the CGI may not change with respect to the NTN, one or more devices of the NTN (e.g., a satellite), or both. That is, the CGI may be fixed. The eNB may transmit a paging message (e.g., S1-AP, or any other paging message) in the geographic area (e.g., determined from the CGI mapping) to one or more UEs 215. However, a broadcast CGI (e.g., for NTN LEO scenarios) of a moving cell or a fixed cell may change over time in a same geographic area where UE 215-*b* may be located. Thus, one or more new techniques may be contemplated such that UE 215-*b* may be able to use WUS in one or more moving cells serving a geographic area in which UE 215-*b* may be located.

The techniques described herein may enable UEs 215 to monitor and receive WUSs from one or more satellites (e.g., satellite 205-*a*, satellite 205-*b*) based on a geographic area of the UEs 215, the satellites 205, or both. For example, UE 215-*b* may use (e.g., monitor, receive) WUSs if UE 215-*b* is within a geographic area (e.g., within a radius of a reference location) even if a cell keeps changing (e.g., satellites 205 keep moving). In some other examples, a network device (e.g., a satellite 205) may assign UE 215-*b* a WUS group (e.g., WUS group identity) based on a last determined position of UE 215-*b*, and UE 215-*b* may monitor for WUSs in the cell if the assigned WUS group (e.g., WUS group identity) at UE 215-*b* and a supported or enabled WUS group (e.g., WUS group identity) by the cell match. In some cases, the network (e.g., via a base station, a satellite 205) may select a WUS resource set for a WUS based on a location or an area specific factor (e.g., geographic area) of UE 215-*b*. In some cases, the network (e.g., via a base station, a satellite 205) may select (e.g., assign) a WUS group (e.g., WUS group identity) for UE 215-*b* based on an area ID. The network (e.g., via a base station, a satellite 205) may configure an area ID to UE 215-*b*, and UE 215-*b* may determine which WUS group (e.g., WUS group identity) to monitor based on the area ID of UE 215-*b*.

In some cases, the network (e.g., via a base station, a satellite 205, one or more devices of a RAN, one or more devices of a core network) may determine geographic areas where the network may use WUSs or WUS groups (e.g., based on coordinates, registration areas, TACs, virtual cell IDs, zone IDs, geo-fencing parameters), or the network may negotiate with UE 215-*b* to determine such areas. Based on (e.g., after) determining a geographic area where the network may use some WUSs or WUS groups, the network (e.g., a base station, a satellite 205) may assign a WUS group (e.g., WUS group identity) to UE 215-*b*. In some examples, the one or more registration areas (e.g., WUS registration areas) may each include one or more TACs, or one or more virtual cell IDs, or one or more zone IDs, or one more cell IDs, or any combination thereof.

In some examples, UE 215-*b* may use (e.g., monitor, receive) WUSs if UE 215-*b* is within a geographic area as a cell changes (e.g., satellites 205 keep moving). That is, UE 215-*b* may use a mobility of UE 215-*b* to determine whether to use (e.g., monitor, receive) WUS or not. For example, UE 215-*b* may determine that UE 215-*b* is located within a radius (e.g., a cell radius) (e.g., a distance in meters (m), kilometers (km), or the like) from a reference location, and UE 215-*b* may use (e.g., monitor, receive) WUSs from satellite 205-*a*, satellite 205-*b*, or both. UE 215-*b* may refrain from using (e.g., monitoring, receiving) WUSs upon determining that UE 215-*b* is located outside of the geographic area (e.g., greater than the radius distance from the reference location). In some cases, UE 215-*b* may report a location of UE 215-*b* while in an RRC connected mode (or during RRC connection), may receive a message from a network device (e.g., a base station, a satellite 205) indicating a location parameter (e.g., the radius, the reference location), and may determine to use WUS if UE 215-*b* is located within the radius distance of the reference location. UE 215-*b* may receive the radius, the reference location, the cell ID, or any combination thereof, via one or more (e.g., multiple) messages, or via one message.

In some other cases, the network device may configure UE 215-*b* with one or more cell IDs (e.g., fixed cell IDs, or virtual cell IDs, which may be referred to as or be similar to WUS areas 210 or WUS registration areas) (e.g., a received location parameter may be or may include the one or more cell IDs) for WUS monitoring, and the network device (e.g., the corresponding cell) may broadcast one or more new virtual or fixed cell IDs covered (e.g., supported) by the cell. In this way, if (e.g., as long as) a network device (e.g., a corresponding cell) broadcasts a same cell ID or virtual cell ID as that which is configured at UE 215-*b*, UE 215-*b* may keep using (e.g., monitoring, receiving) WUSs (e.g., regardless of an identity of the cell (e.g., a physical cell identifier (PCID) or a CGI of the cell)).

In some examples, a network (e.g., via a network entity, such as a satellite 205) may assign (e.g., configure) a WUS group (e.g., WUS group identity) to UE 215-*b* based on a last position of UE 215-*b* (e.g., an area of UE 215-*b*, which may be a fixed geographic area). For example, the network may transmit a message that indicates a WUS configuration that indicates that UE 215-*b* is assigned a WUS group (e.g., group identity). The network may assign a WUS group (e.g., WUS group identity) to UE 215-*b* when UE 215-*b* is connected from (e.g., located in) WUS area 210-*b*, which may be a fixed area (e.g., relative to Earth) (e.g., such as a TAC 220, or a subset of a TAC 220 such as TAC 220-*a*, or defined by coordinates, a registration area, a virtual cell ID, a zone ID, one or more geo-fencing parameters, or the like).

In this way, WUS groups may correspond to WUS areas 210. The fixed geographic area may be defined by one or more coordinates (e.g., global navigation satellite system (GNSS) coordinates), one or more registration areas, one or more TACs, one or more virtual cell identifiers, one or more zone identifiers, one or more geo-fencing parameters, or the like, such as WUS areas 210 or TACs 220. In some examples, the one or more registration areas (e.g., WUS registration areas) may each include one or more TACs, or one or more virtual cell IDs, or one or more zone IDs, or one more cell IDs, or any combination thereof. To assign the WUS group (e.g., WUS group identity) to UE 215-*b*, satellite 205-*a* may transmit a NAS message or RRC message to UE 215-*b*. In some examples, the RRC message may be an example of an RRC release message. In some examples, the RRC message may be an example of a dedicated RRC message. The network (e.g., via satellite 205-*a* or a corresponding cell) may transmit (e.g., broadcast) a message indicating that satellite 205-*a* supports the WUS group (e.g., WUS group identity) (e.g., that is, indicating that satellite 205-*a* may use the WUS group (e.g., WUS group identity) to alert UEs (e.g., in the fixed geographic area)), and UE 215-*b* may monitor for WUSs if UE 215-*b* is configured with the WUS group (e.g., WUS group identity) and the network (e.g., satellite 205-*a*) supports the same WUS group. A satellite 205 (e.g., satellite 205-*a*) may support a WUS group (e.g., WUS group identity) based on the location of satellite 205 over the ground (e.g., perpendicular to the surface of the Earth). For example, satellite 205-*a* may support a first WUS group (e.g., WUS group identity) based on satellite 205-*a* being located over WUS area 210-*b*.

In some cases, the network (e.g., via satellite 205-*a* or a corresponding cell) may enable one or more WUS groups (e.g., for one or more UEs 215). That is, WUS may be enabled for some UEs 215 and may not be enabled for some UEs 215. For example, if UE 215-*a* is assigned to a first WUS group, UE 215-*b* is assigned to a second WUS group, and satellite 205-*a* broadcasts support of the second WUS group (e.g., WUS group identity) (e.g., and not the first WUS group), UE 215-*b* may monitor for WUSs according to the second WUS group, but UE 215-*a* may not monitor for WUSs according to the second WUS group, as UE 215-*a* is assigned to the first WUS group (e.g., WUS group identity) (e.g., and not the second WUS group). In some cases, the network (e.g., via a network entity such as satellite 205-*a*) may assign multiple WUS groups to a single UE 215.

In some cases, a network entity (e.g., a satellite 205) may reserve a quantity of WUS groups (e.g., WUS group identities) (e.g., corresponding to WUS areas 210) and UE 215-*b* or the network entity may not perform a calculation of (e.g., to determine) one or more WUS groups. The calculation of a total quantity of WUS groups (e.g., which may be performed by a legacy UE) may be defined as a maximum quantity of WUS resources (e.g., time and frequency resources for WUSs) multiplied by a maximum quantity of WUS groups (e.g., which may represent or correspond to different WUS signal types or signal group identities, WUS sequences, WUS group IDs). For example, four WUS resources (e.g., potential WUS resources) multiplied by eight WUS groups may equal thirty-two total WUS groups. By reserving (e.g., by the network entity) WUS groups corresponding to WUS areas 210, UE 215-*b* or the network entity may not perform the calculation, and may be able to determine a WUS group (e.g., WUS group ID, WUS group number) via WUS group identities of the reserved WUS groups. In some other examples, UE 215-*b* or the network entity may be able to determine (e.g., infer, via a table, the calculation, a second calculation, a mapping, or any other specification) corresponding resources (e.g., a resource number), a WUS group, a WUS group ID, a WUS group number, or any combination thereof (e.g., based on a WUS group or total quantity of WUS groups) In some cases, the network entity may be an example of a cell. In such cases, the functions and features associated with a network entity may be performed in the context of a cell associated with the network entity.

In some cases, UE 215-*b* may monitor for both a WUS corresponding to an assigned WUS group (e.g., WUS group identity) (e.g., corresponding to a WUS area 210) that is supported by a satellite 205, and UE 215-*b* may monitor for a common WUS. The common WUS may be a WUS that may be location-independent (e.g., independent of a geographic area), and may be monitored by some or all UEs 215 in wireless communications system 200. UE 215-*b* may not use a calculation of WUS groups (e.g., a calculation based on a paging probability) for monitoring for both the WUS corresponding to the assigned WUS group (e.g., WUS group identity) and the common WUS.

In some cases, WUS groups (e.g., corresponding to WUS areas 210) may be reused at different geographic locations according to a re-use factor. That is, WUS groups may be reused with a re-use factor of more than one cell. For example, WUS area 210-*a* may correspond to a first WUS area (e.g., WUS area 1), and WUS area 210-*c* may correspond to the first WUS area as well (e.g., WUS area 1). In some cases, each TAC 220 may include some or the same corresponding WUS areas 210. If a re-use factor is 2, TAC 220-*a* may include a first WUS area (e.g., WUS area 1) and a second WUS area (e.g., WUS area 2) (e.g., WUS area 210-*a* and WUS area 210-*b*, respectively), and TAC 220-*b* may include the first WUS area (e.g., WUS area 1) and the second WUS area (e.g., WUS area 2) (e.g., WUS area 210-*c* and WUS area 210-*d*, respectively). That is, the first WUS area may be able to be repeated after 2 WUS areas, and as such, WUS area 1 may be repeated for WUS area 210-*a* and WUS area 210-*c*. In this way, WUS groups may be able to be reused and supported at repeating WUS area intervals. Other combinations of reusability may be considered. For example, more or fewer than two WUS areas 210 may be reused, and one or more WUS areas 210 may be included in an area with defined coordinates, or any other area type. For example, if a re-use factor is 3, the first WUS area may be able to be repeated after 3 WUS areas (e.g., an order may be WUS area 1, WUS area 2, WUS area 3, WUS area 1, WUS area 2, and so on). Some WUS areas 210 may repeat in some areas (e.g., some TACs 220) and not in others.

While the techniques described herein may be beneficial for stationary or low mobility UEs 215, UEs 215 may move to other WUS area 210 in some cases. For example, (e.g., in an idle state or mode), a UE 215-*a* may move from the location of UE 215-*a* to the location of UE 215-*b*. The UE 215 may identify an area ID corresponding to the location of the UE 215 (e.g., WUS area 210-*b*) by using a mapping function (e.g., which may be configured to the UE 215 by a network entity, such as a satellite 205). The UE 215 may monitor, from satellite 205-*a*, for WUS corresponding to a WUS group (e.g., WUS group identity) that is associated with WUS area 210-*b*, TAC 220-*a*, or both, and may not monitor for WUS corresponding to the WUS group (e.g., WUS group identity) from satellite 205-*b*, as satellite 205-*b* may be serving (e.g., may support) a different geographic area (e.g., corresponding to a different WUS group) (e.g., WUS area 210-*c*, TAC 220-*b*, or both).

In some examples, UE 215-*b* may be able to identify a WUS or corresponding WUS group (e.g., WUS group identity) based on a resource set selection procedure using an area specific factor (e.g., a selection parameter) or an area ID configured to the UE. That is, a WUS resource set may be based on a WUS group. The following table may illustrate an incorporation of the area specific factor for determining a WUS group set for a WUS resource set selection procedure:

TABLE 1

| WUS Group Set Definition | | | |
|---|---|---|---|
| WUS Group | | WUS Group Index in WUS Groups List | |
| Set | AreaList | Lower Bound | Upper Bound |
| 1 | $P_{area1}$ = Area 1 | 0 | $N_{th1} - 1$ |
| 2 | $P_{area1}$ = Area 2 | $N_{th1}$ | $N_{th1} + N_{th2} - 1$ |
| 3 | $P_{area1}$ = Area 3 | $N_{th1} + N_{th2}$ | $N_{th1} + N_{th2} + N_{th3} - 1$ |
| 4 | Otherwise | $N_{th1} + N_{th2} + N_{th3}$ | maxWG − 1 |

In some cases, when a total quantity of WUS group sets is less than 4, an upper bound for the WUS group set with a highest index may be maxWG-1. In some cases, $N_{thi}$ may be a value signaled in the $i^{th}$ entry of groupsForServiceList. In some cases, groupsForServiceList may be a quantity of WUS groups for one or more (e.g., each) paging probability groups. In some cases, maxWG may be a total quantity of WUS groups. If UE 215-*b* is an area other than those on the list (e.g., in this case, Area 1, Area 2, Area 3) (e.g., hence "otherwise"), UE 215-*b* may determine that the WUS or WUS group (e.g., WUS group identity) assigned to UE 215-*b* is in corresponding WUS Group Set 4.

The area specific factor may include the column AreaList (or any one or more of the table entries for the column). If UE 215-*b* is configured with an area (e.g., Area 1) or determines that UE 215-*b* is located in the area (e.g., determined via a probability $P_{area\ i}$ (e.g., $P_{area1}$ for Area 1)), UE 215-*b* may determine that the WUS or corresponding WUS group (e.g., WUS group identity) assigned to UE 215-*b* is in a corresponding WUS Group Set (e.g., WUS Group Set 1 for Area 1, WUS Group Set 2 for Area 2, and so on). UE 215-*b* or one or more network devices (e.g., a satellite 205) may perform a resource set selection procedure based on the area specific factor or an area ID configured to the UE. UE 215-*b* may determine a WUS group ID or WUS group index from the WUS Group Set using one or more calculations. In some examples, UE 215-*b* may receive a WUS configuration from a satellite 205, which may include or indicate the set of resources, a WUS group (e.g., WUS group identity) (e.g., for UE 215-*b*), or both.

In some examples, UE 215-*b* may select a WUS group (e.g., WUS group identity) using one or more equations based on (e.g., using) an area ID parameter (e.g., rather than a UE ID parameter). The area ID parameter may correspond to a geographic area of UE 215-*b*, a geographic area of which a satellite 205 may be located over, or any combination thereof. UE 215-*b* may receive the area ID from a network (e.g., via a satellite 205). A first equation for selecting a WUS group (e.g., WUS group identity) to monitor based on an area ID parameter (e.g., for bandwidth reduced low complexity (BL) UEs 215 or UEs 215 in enhanced coverage) may be shown below:

$$wg = \text{floor}\left(\text{floor}\left(\frac{\text{Area\_ID}}{N \times N_s}\right)/N_n\right) \text{mod } N_w$$

A second equation for selecting a WUS group (e.g., WUS group identity) to monitor based on an area ID parameter (e.g., for narrow band (NB) internet of things (IoT) (NB-IoT) applications) may be shown below:

$$wg = \text{floor}\left(\frac{\text{Area\_ID}}{N \times N_s \times W}\right) \text{mod } N_w$$

N may be defined as an output of a function min(T, nB). nB may be defined as 4T, 2T, T, T/2, T/4, T/8, T/16, T/32, T/64, T/128, and T/256, and for NB-IoT also T/512, and T/1024, and T may be defined as a discontinuous reception (DRX) cycle of a UE (e.g., UE 215-*b*). $N_S$ may be defined as an output of a function max(1, nB/T). $N_w$ may be a quantity of WUS groups in a selected WUS group set (e.g., in Table 1). W may be defined as a total weight of some or all NB-IoT paging carriers. floor may refer to a common mathematical operation $\lfloor x \rfloor$ that outputs a greatest integer that is less than or equal to x, where x is the input of the function. mod may refer to a common mathematical operation that outputs a remainder of the term before the operator divided by the term after the operator. wg may refer to a WUS group ID or a WUS group index (e.g., from a determined WUS group set from Table 1).

In some examples (e.g., when a UE 215 is in an RRC connected state (e.g., RRC_CONNECTED)), a network (e.g., one or more devices of a RAN and one or more devices of a core network) may negotiate (e.g., transmit and receive signaling) geographic areas (e.g., WUS areas 210) for WUS groups, or where WUS may be used. In some cases, the RAN, the core network, or both, may include, be included by, or be able to communicate with an NTN network of wireless communications system 200. The network may determine to use coordinates (e.g., GNSS coordinates) (e.g., using a reference location, a radius, a polygon, or any combination thereof) to define where WUS groups may be used (e.g., to define WUS areas 210), may determine to use TACs (e.g., WUS areas 210 may be TACs), may determine to use virtual cell IDs, may determine to use zone IDs, may determine to use registration areas, may determine to use geo-fencing parameters, or any combination thereof. For example, the network may determine that WUS areas 210 may be defined using coordinates, and may determine that WUS areas 210 may be subsets of TACs 220. In some cases, UEs 215 may have little or no negotiating ability (e.g., ability to determine or help determine such geographic areas for WUS groups). One or more devices of the RAN may initiate the negotiation (e.g., with the core network), may determine which WUS group (e.g., WUS group identity) to use for geographic areas, and may transmit an indication of a WUS group (e.g., WUS group identity) for a geographic area to a UE 215.

In some other examples (e.g., when a UE 215 is in an RRC connected state (e.g., RRC_CONNECTED)), a core network (e.g., one or more devices of a core network) and the UE 215 may negotiate (e.g., transmit and receive signaling) geographic areas (e.g., WUS areas 210) for WUS groups, or where WUS may be used. The UE 215 and the core network may negotiate using one or more NAS messages (e.g., during a service request or a tracking area update (TAU)), one or more RRC release messages, or both. For example, a core network device (e.g., a satellite 205) may receive an uplink RRC message from the UE 215 (e.g., Msg5 corresponding to an RRC Setup Complete message) that may include a WUS request bit (e.g., requesting a WUS group (e.g., WUS group identity) to monitor corresponding to a WUS area 210), and the core network device (e.g., via a satellite 205) may transmit an RRC release message to a UE 215 indicating which geographic area (e.g., WUS area 210) the UE 215 may monitor for WUSs. In some cases, the core network may include, be included by, or be able to communicate with an NTN network of wireless communications system 200. In some cases, the UE 215 may transmit a preference indication, a capability indication, a request, location information (e.g., of the UE 215), or any combination thereof to a core network device (e.g., via a satellite 205), for a WUS configuration (e.g., WUS group), a corresponding geographic area (e.g., a WUS area 210) for a WUS group, or both (e.g., a network area of interest, which may be where the UE has a preference to use (e.g., monitor for) WUS).

In some cases, the UE 215 may request the core network to release (e.g., transmit, indicate) a WUS configuration (e.g., WUS group) corresponding to a geographic area. The core network and the UE 215 may determine to use coordinates (e.g., GNSS coordinates) (e.g., using a reference location, a radius, a polygon, or any combination thereof) to define where WUS groups may be used (e.g., to define WUS areas 210), may determine to use TACs (e.g., WUS areas 210 may be TACs), may determine to use virtual cell IDs, may determine to use zone IDs, may determine to use registration areas, may determine to use geo-fencing parameters, or any combination thereof. For example, the core network and the UE 215 may determine that WUS areas 210 may be defined using coordinates, and may determine that WUS areas 210 may be subsets of TACs 220.

Figure 3:
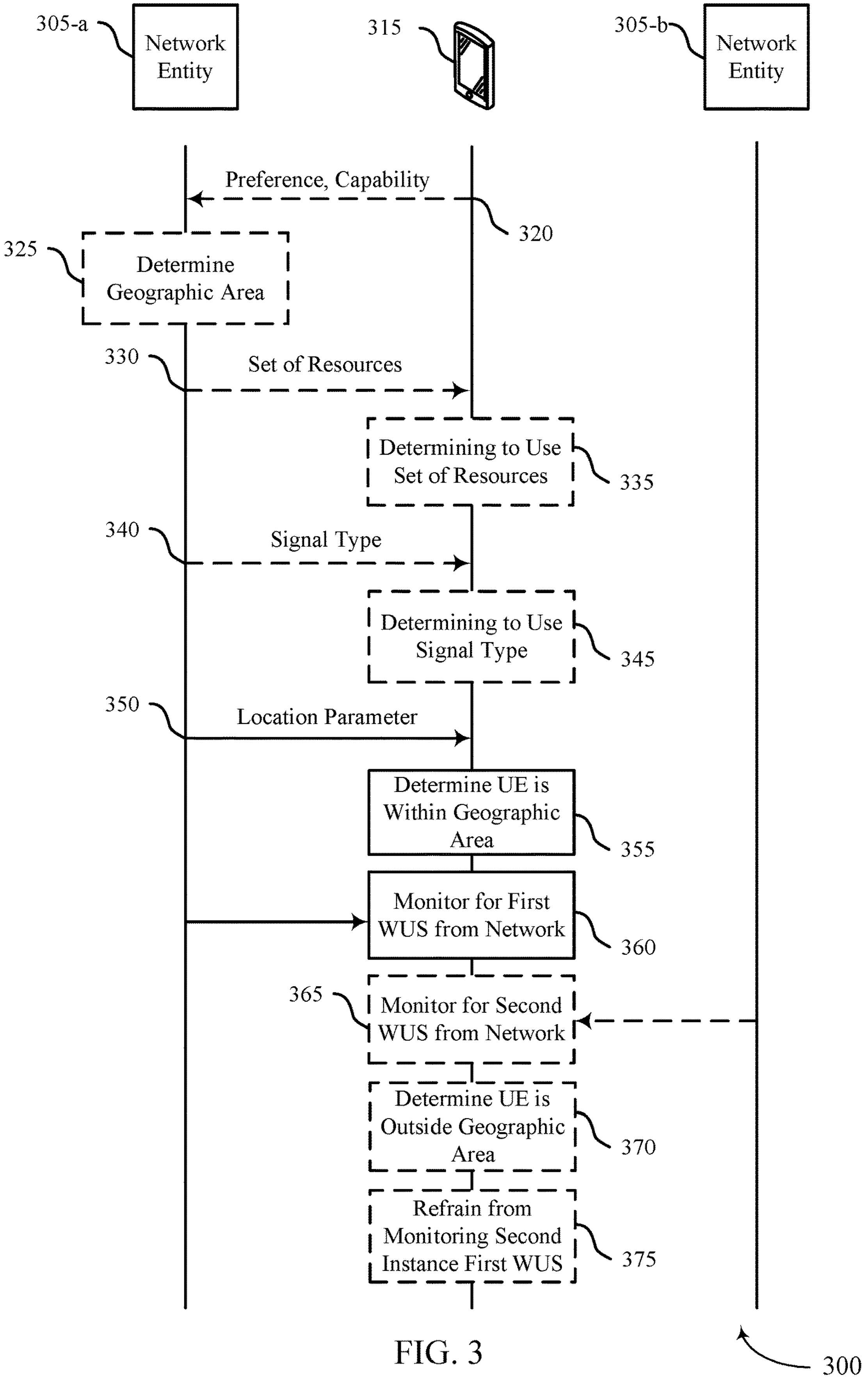
FIG. 3 illustrates an example of a process flow that supports location based WUS in accordance with aspects of the present disclosure.

FIG. 3 illustrates an example of a process flow 300 that supports location based WUS in accordance with aspects of the present disclosure. The process flow 300 may implement or be implemented by aspects of the wireless communications system 100, wireless communications system 200, or a combination of these, as described with reference to FIGS. 1 and 2. In some examples, the process flow 300 may include example operations associated with network entity 305-*a* (e.g., a satellite), network entity 305-*b* (e.g., a satellite), or UE 315, which may be examples of corresponding devices described with reference to FIGS. 1 and 2. In the following description of the process flow 300, the operations between network entity 305-*a*, network entity 305-*b*, and UE 315 may be performed in a different order than the example order shown, or the operations performed by network entity 305-*a*, network entity 305-*b*, and UE 315 may be performed in different orders or at different times. Some operations may also be omitted from the process flow 300, and other operations may be added to the process flow 300.

At 320, UE 315 may transmit, to a network device of a network (e.g., network entity 305-*a*), a second message indicating one or more preferences for a geographic area associated with a first WUS, a capability to use the geographic area associated with the first WUS, location information (e.g., of UE 315), or any combination thereof, where the network may include a non-terrestrial network. In some examples, the second message may include a NAS message or an RRC message.

At 325, network entity 305-*a* may determine the geographic area associated with the WUS and associated with a location parameter, where the geographic area may be defined by one or more WUS registration areas, one or more GNSS coordinates, one or more TACs, one or more virtual cell identifiers, one or more zone identifiers, one or more geo-fencing parameters, or any combination thereof. In some examples, the one or more WUS registration areas may each include one or more second of TACs, or one or more second virtual cell identifiers, or one or more second zone identifiers, or one more second cell identities, or any combination thereof.

At 330, UE 315 may receive, from network entity 305-*a*, a selection parameter that corresponds to the geographic area and indicates a set of resources used by the first WUS.

At 335, UE 315 may determine to use the set of resources based on the selection parameter.

At 340, UE 315 may receive, from network entity 305-*a*, a selection parameter that corresponds to the geographic area and indicates a signal group identity (e.g., a signal type, a WUS group) used by the first WUS.

At 345, UE 315 may determine to use the signal group identity based on the selection parameter.

At 350, UE 315 may receive, from network entity 305-*a* of the non-terrestrial network, a first message indicating the location parameter associated with a WUS configuration. In some examples, the WUS configuration may include the set of resources. In some examples, the location parameter may include a cell identifier (e.g., a cell ID, virtual cell ID), a reference location associated with the geographic area, a radius, or any combination thereof. In some examples, the receiving of the first message indicating the location parameter associated with the WUS configuration may be based on the transmitting of the second message. In some examples, the first message may include an RRC message (e.g., an RRC release message).

At 355, UE 315 may determine that UE 315 is located within the geographic area associated with the location parameter based on the receiving of the first message. In some examples, UE 315 may determine that UE 315 is located within a radius distance from the reference location.

At 360, UE 315 may monitor for a first WUS from the first network entity (e.g., network entity 305-*a*) based on the determining that the UE 315 is located within the geographic area. In some examples, the monitoring for the first WUS may be based on the set of resources. In some examples, the monitoring for the first WUS may be based on the signal group identity.

At 365, UE 315 may monitor for a second WUS from a second network entity (e.g., network entity 305-*b*) of the non-terrestrial network based on the determining that UE 315 is located within the geographic area.

At 370, UE 315 may determine that UE 315 is located outside of the geographic area after monitoring for the first WUS.

At 375, UE 315 may refrain from monitoring for a second instance of the first WUS based on the determining that UE 315 is located outside of the geographic area.

Figure 4:
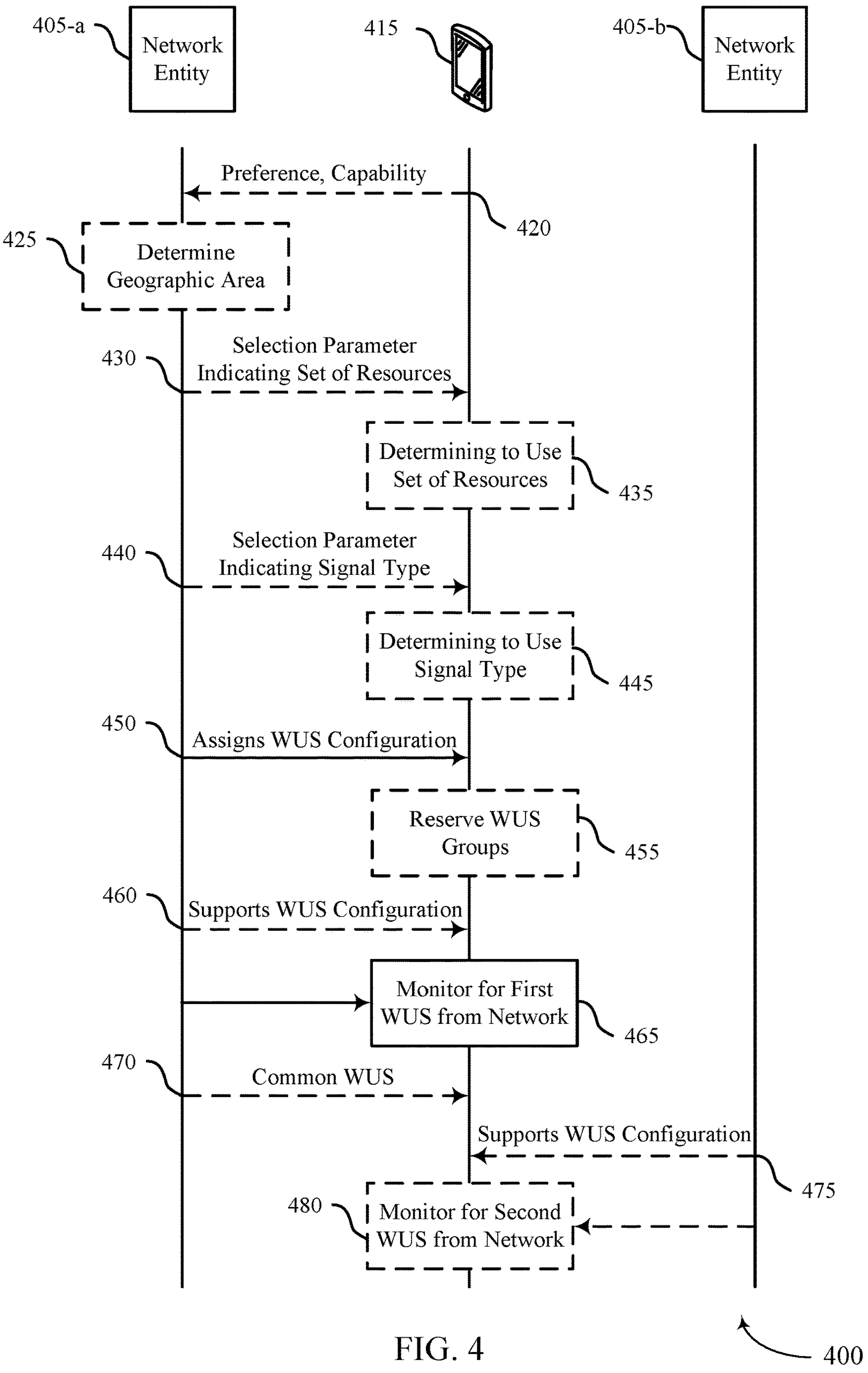
FIG. 4 illustrates an example of a process flow that supports location based WUS in accordance with aspects of the present disclosure.

FIG. 4 illustrates an example of a process flow 400 that supports location based WUS in accordance with aspects of the present disclosure. The process flow 400 may implement or be implemented by aspects of the wireless communications system 100, wireless communications system 200, process flow 300, or a combination of these, as described with reference to FIGS. 1, 2, and 3. In some examples, the process flow 400 may include example operations associated with network entity 405-*a* (e.g., a satellite), network entity 405-*b* (e.g., a satellite), or UE 415, which may be examples of corresponding devices described with reference to FIGS. 1, 2, and 3. In the following description of the process flow 400, the operations between network entity 405-*a*, network entity 405-*b*, and UE 415 may be performed in a different order than the example order shown, or the operations performed by network entity 405-*a*, network entity 405-*b*, and UE 415 may be performed in different orders or at different times. Some operations may also be omitted from the process flow 400, and other operations may be added to the process flow 400.

At 420, UE 415 may transmit, to a network device of a network (e.g., network entity 405-*a*), a second message indicating one or more preferences for a geographic area associated with a first WUS, a capability to use the geographic area associated with the first WUS, location information (e.g., of UE 415), or any combination thereof, where the network may include the non-terrestrial network. In some examples, the second message may include a NAS message or an RRC message.

At 425, network entity 405-*a* may determine the geographic area associated with the first WUS, where the geographic area associated with the first WUS may be defined by one or more WUS registration areas, one or more GNSS coordinates, one or more TACs, one or more virtual cell identifiers, one or more zone identifiers, one or more geo-fencing parameters, or any combination thereof. In some examples, the one or more WUS registration areas may each include one or more second of TACs, or one or more second virtual cell identifiers, or one or more second zone identifiers, or one more second cell identities, or any combination thereof.

At 430, UE 415 may receive, from network entity 405-*a*, a selection parameter that corresponds to the geographic area and indicates a set of resources used by the first WUS.

At 435, UE 415 may determine to use the set of resources based on the selection parameter.

At 440, UE 415 may receive, from network entity 405-*a*, a selection parameter that corresponds to the geographic area and indicates a signal group identity (e.g., a signal type, a WUS group) used by the first WUS.

At 445, UE 415 may determine to use the signal group identity based on the selection parameter.

At 450, UE 415 may receive, from network entity 405-*a* of the non-terrestrial network, a first message indicating a first WUS configuration that indicates that UE 415 is assigned a WUS group identity, where the WUS group identity may be associated with a geographic area. In some examples, the first WUS configuration may include the set of resources. In some examples, the receiving of the first message indicating that UE 415 is assigned the first WUS configuration that corresponds to the geographic area may be based on the transmitting of the second message. In some examples, the first message may include a NAS message or an RRC release message.

At 455, network entity 405-*a* may reserve one or more second WUS groups based on transmitting the first message (e.g., by the network entity 405-*a*).

At 460, UE 415 may receive, from network entity 405-*a*, a second message indicating that the first network entity uses the first WUS group (e.g., supports the first WUS configuration) to alert UEs 415 in the geographic area. In some examples, network entity 405-*a* transmitting the second message indicating that network entity 405-*a* uses the first WUS configuration to alert UEs 415 in the geographic area may be based on network entity 405-*a* being located above the geographic area. In some examples, the second message may be received in a broadcast message.

At 465, UE 415 may monitor for a first WUS from network entity 405-*a* based on the WUS group identity included in the first message, where a first WUS group corresponds to the first WUS configuration. In some examples, UE 415 may monitor for the first WUS based on the receiving the second message. In some examples, the monitoring for the first WUS may be based on the set of resources. In some examples, the monitoring for the first WUS may be based on the signal group identity.

At 470, UE 415 may monitor for a second WUS from network entity 405-*a* based on a second WUS configuration that may be independent of the geographic area (e.g., a common WUS).

At 475, UE 415 may receive, from network entity 405-*b* of the non-terrestrial network, a second message indicating that network entity 405-*b* uses the first WUS configuration (e.g., supports the first WUS configuration) to alert UEs 415.

At 480, UE 415 may monitor for a second WUS group identity from network entity 405-*b* based on the first WUS configuration included in the second message at 475. In some examples, the second WUS group identity may correspond to the first WUS configuration.

Figure 5:
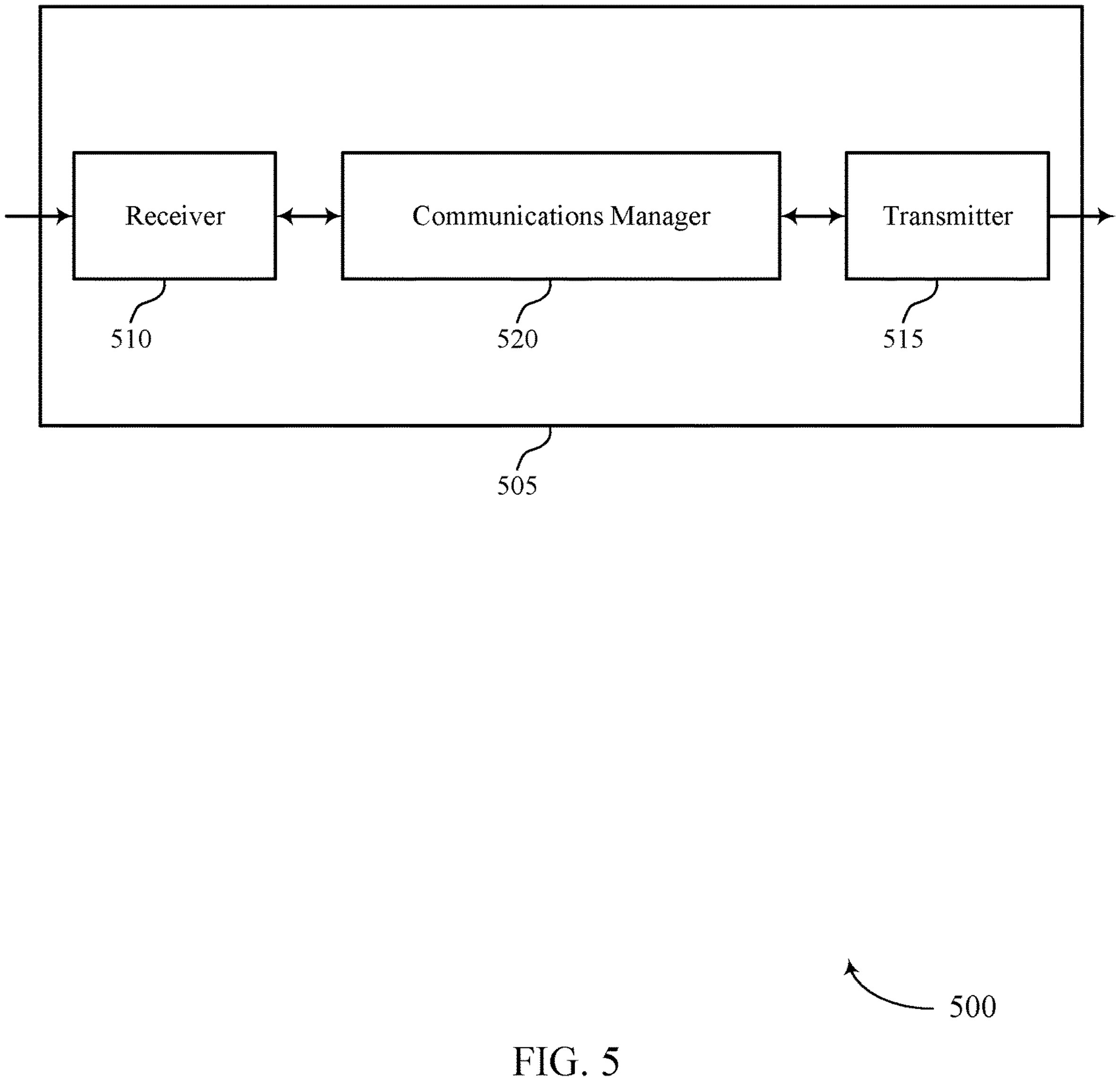
FIGS. 5 and 6 show block diagrams of devices that support location based WUS in accordance with aspects of the present disclosure.

FIG. 5 shows a block diagram 500 of a device 505 that supports location based WUS in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to location based WUS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to location based WUS). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of location based WUS as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a first network entity of a NTN, a first message indicating a location parameter associated with a WUS configuration. The communications manager 520 may be configured as or otherwise support a means for determining that the UE is located within a geographic area associated with the location parameter based on the receiving of the first message. The communications manager 520 may be configured as or otherwise support a means for monitoring for a first WUS from the first network entity based on the determining that the UE is located within the geographic area.

Additionally or alternatively, the communications manager 520 may support wireless communications at a UE in accordance with examples as disclosed herein. For example, the communications manager 520 may be configured as or otherwise support a means for receiving, from a first network entity of an NTN, a first message indicating a first WUS configuration that indicates that the UE is assigned a WUS group identity, where the WUS group identity is associated with a geographic area. The communications manager 520 may be configured as or otherwise support a means for monitoring for a first WUS from the first network entity based on the WUS group identity included in the first message, where a first WUS group corresponds to the first WUS configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
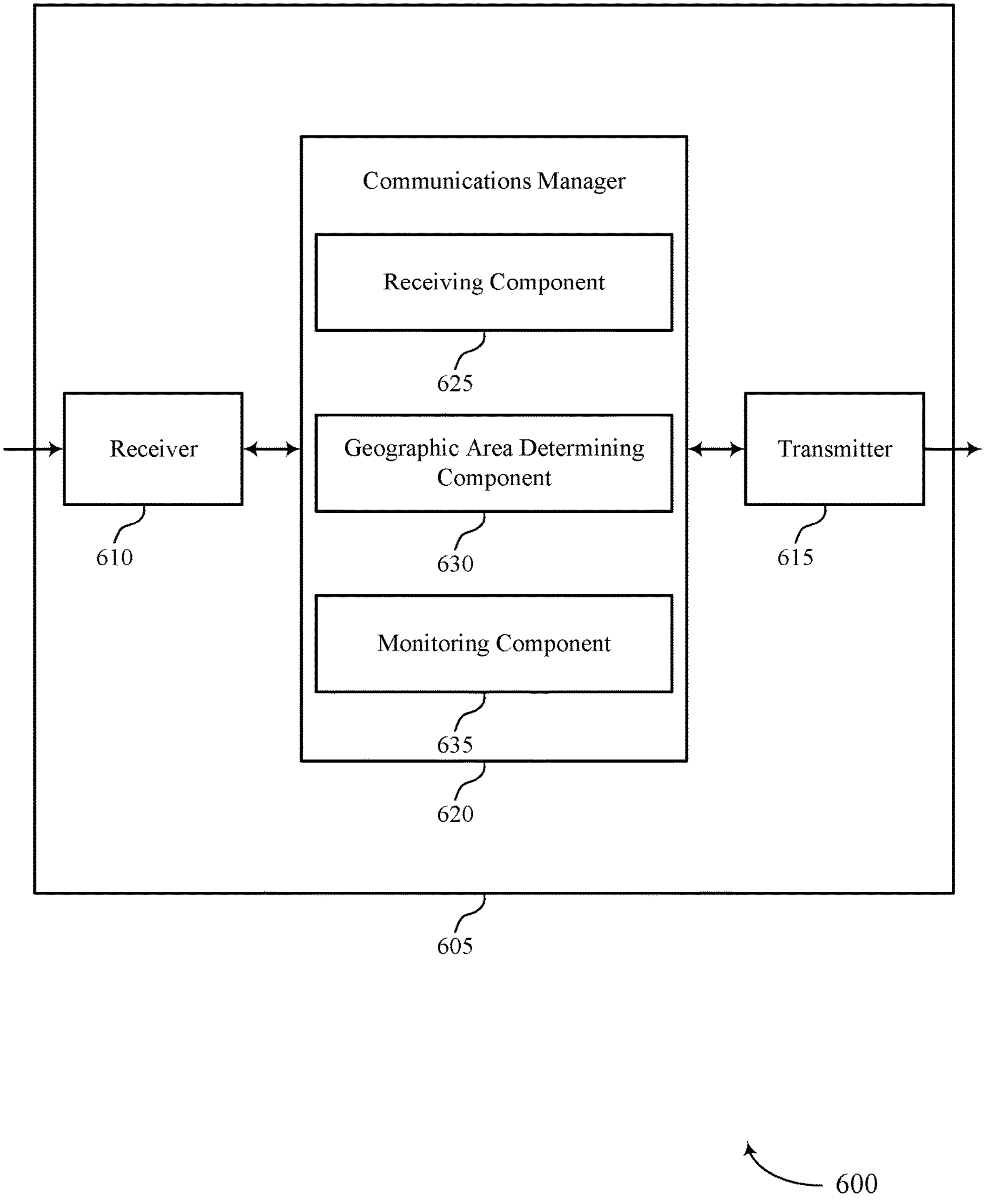

FIG. 6 shows a block diagram 600 of a device 605 that supports location based WUS in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to location based WUS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to location based WUS). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of location based WUS as described herein. For example, the communications manager 620 may include a receiving component 625, a geographic area determining component 630, a monitoring component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The receiving component 625 may be configured as or otherwise support a means for receiving, from a first network entity of an NTN, a first message indicating a location parameter associated with a WUS configuration. The geographic area determining component 630 may be configured as or otherwise support a means for determining that the UE is located within a geographic area associated with the location parameter based on the receiving of the first message. The monitoring component 635 may be configured as or otherwise support a means for monitoring for a first WUS from the first network entity based on the determining that the UE is located within the geographic area.

Additionally or alternatively, the communications manager 620 may support wireless communications at a UE in accordance with examples as disclosed herein. The receiving component 625 may be configured as or otherwise support a means for receiving, from a first network entity of an NTN, a first message indicating a first WUS configuration that indicates that the UE is assigned a WUS group identity, where the WUS group identity is associated with a geographic area. The monitoring component 635 may be configured as or otherwise support a means for monitoring for a first WUS from the first network entity based on the WUS group identity included in the first message, where a first WUS group corresponds to the first WUS configuration.

Figure 7:
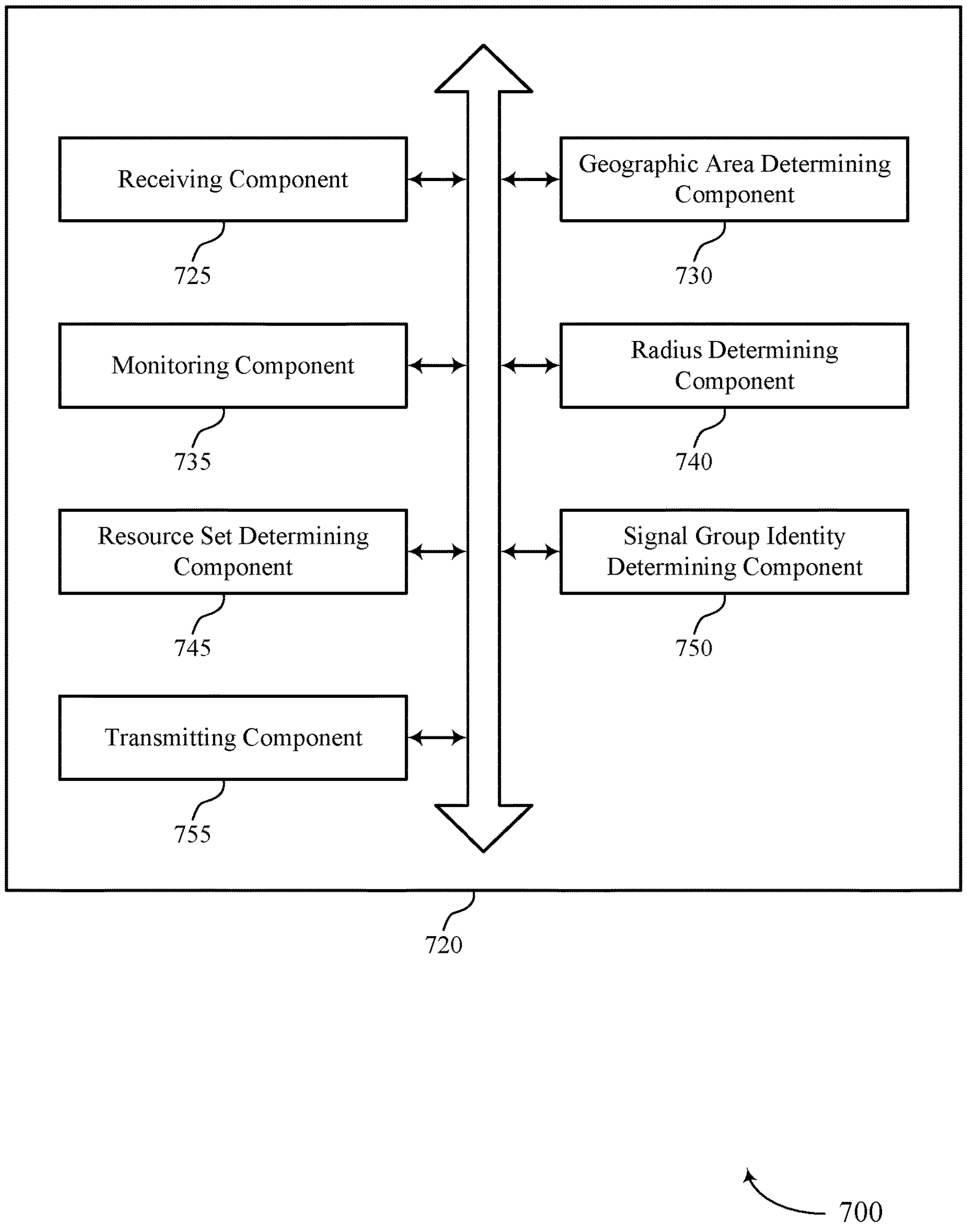
FIG. 7 shows a block diagram of a communications manager that supports location based WUS in accordance with aspects of the present disclosure.

FIG. 7 shows a block diagram 700 of a communications manager 720 that supports location based WUS in accordance with aspects of the present disclosure. The communications manager 720 may be an example of aspects of a communications manager 520, a communications manager 620, or both, as described herein. The communications manager 720, or various components thereof, may be an example of means for performing various aspects of location based WUS as described herein. For example, the communications manager 720 may include a receiving component 725, a geographic area determining component 730, a monitoring component 735, a radius determining component 740, a resource set determining component 745, a signal group identity determining component 750, a transmitting component 755, or any combination thereof. Each of these components may communicate, directly or indirectly, with one another (e.g., via one or more buses).

The communications manager 720 may support wireless communications at a UE in accordance with examples as disclosed herein. The receiving component 725 may be configured as or otherwise support a means for receiving, from a first network entity of an NTN, a first message indicating a location parameter associated with a WUS configuration. The geographic area determining component 730 may be configured as or otherwise support a means for determining that the UE is located within a geographic area associated with the location parameter based on the receiving of the first message. The monitoring component 735 may be configured as or otherwise support a means for monitoring for a first WUS from the first network entity based on the determining that the UE is located within the geographic area.

In some examples, the monitoring component 735 may be configured as or otherwise support a means for monitoring for a second WUS from a second network entity of the NTN based on the determining that the UE is located within the geographic area.

In some examples, the geographic area determining component 730 may be configured as or otherwise support a means for determining that the UE is located outside of the geographic area after monitoring for first WUS. In some examples, the monitoring component 735 may be configured as or otherwise support a means for refraining from monitoring for a second instance of the first WUS based on the determining that the UE is located outside of the geographic area.

In some examples, the location parameter includes a cell identifier, a reference location associated with the geographic area, a radius, or any combination thereof.

In some examples, to support determining that the UE is located within the geographic area associated with the location parameter, the radius determining component 740 may be configured as or otherwise support a means for determining that the UE is located within a radius distance from a reference location.

In some examples, the receiving component 725 may be configured as or otherwise support a means for receiving, from the first network entity, a selection parameter that corresponds to the geographic area and indicates a set of resources used by the first WUS, the WUS configuration including the set of resources. In some examples, the resource set determining component 745 may be configured as or otherwise support a means for determining to use the set of resources based on the selection parameter, where the monitoring for the first WUS is based on the set of resources.

In some examples, the receiving component 725 may be configured as or otherwise support a means for receiving, from the first network entity, a selection parameter that corresponds to the geographic area and indicates a signal group identity used by the first WUS. In some examples, the signal group identity determining component 750 may be configured as or otherwise support a means for determining to use the signal group identity based on the selection parameter, where the monitoring for the first WUS is based on the signal group identity.

In some examples, the geographic area associated with the location parameter for the first WUS is defined by one or more WUS registration areas, one or more GNSS coordinates, one or more TACs, one or more virtual cell IDs, one or more zone IDs, one or more geo-fencing parameters, or any combination thereof.

In some examples, the one or more WUS registration areas each include one or more second TACs, or one or more second virtual cell IDs, one or more second zone IDs, one more second cell identities, or any combination thereof.

In some examples, the transmitting component 755 may be configured as or otherwise support a means for transmitting, to a network device of a network, a second message indicating one or more preferences for the geographic area associated with the first WUS, a capability to use the geographic area associated with the first WUS, location information, or any combination thereof, where the network includes the NTN, and where the receiving of the first message indicating the location parameter associated with the WUS configuration is based on the transmitting of the second message.

In some examples, the second message includes an NAS message or an RRC message. In some examples, the first message includes an RRC message, an RRC release message, or a dedicated RRC message. In some examples, the first network entity comprises a first cell associated with the first network entity.

Additionally or alternatively, the communications manager 720 may support wireless communications at a UE in accordance with examples as disclosed herein. In some examples, the receiving component 725 may be configured as or otherwise support a means for receiving, from a first network entity of an NTN, a first message indicating a first WUS configuration that indicates that the UE is assigned a WUS group identity, where the WUS group identity is associated with a geographic area. In some examples, the monitoring component 735 may be configured as or otherwise support a means for monitoring for a first WUS from the first network entity based on the WUS group identity included in the first message, where a first WUS group corresponds to the first WUS configuration.

In some examples, the receiving component 725 may be configured as or otherwise support a means for receiving, from the first network entity, a second message indicating that the first network entity uses the first WUS group to alert UEs in the geographic area, where the monitoring for the first WUS is based on the receiving the second message, where the second message is received in a broadcast message.

In some examples, the first message includes an NAS message or an RRC message, an RRC release message, or a dedicated RRC message.

In some examples, the receiving component 725 may be configured as or otherwise support a means for receiving, from a second network entity of the NTN, a second message indicating that the second network entity uses the first WUS configuration to alert UEs. In some examples, the monitoring component 735 may be configured as or otherwise support a means for monitoring for a second WUS group identity from the second network entity based on the first WUS configuration included in the second message, where the second WUS group identity corresponds to the first WUS configuration.

In some examples, the monitoring component 735 may be configured as or otherwise support a means for monitoring for a second WUS from the first network entity based on a second WUS configuration that is independent of the geographic area.

In some examples, the receiving component 725 may be configured as or otherwise support a means for receiving, from the first network entity, a selection parameter that corresponds to the geographic area and indicates a set of resources used by the first WUS, the first WUS configuration including the set of resources. In some examples, the resource set determining component 745 may be configured as or otherwise support a means for determining to use the set of resources based on the selection parameter, where the monitoring for the first WUS is based on the set of resources.

In some examples, the receiving component 725 may be configured as or otherwise support a means for receiving, from the first network entity, a selection parameter that corresponds to the geographic area and indicates a signal group identity used by the first WUS. In some examples, the signal group identity determining component 750 may be configured as or otherwise support a means for determining to use the signal group identity based on the selection parameter, where the monitoring for the first WUS is based on the signal group identity.

In some examples, the geographic area associated with the first WUS is defined by one or more WUS registration areas, one or more GNSS coordinates, one or more TACs, one or more virtual cell IDs, one or more zone IDs, one or more geo-fencing parameters, or any combination thereof. In some examples, the one or more WUS registration areas each include one or more second TACs, or one or more second virtual cell IDs, one or more second zone IDs, one more second cell identities, or any combination thereof.

In some examples, the transmitting component 755 may be configured as or otherwise support a means for transmitting, to a network device of a network, a second message indicating one or more preferences for the geographic area associated with the first WUS, a capability to use the geographic area associated with the first WUS, location information, or any combination thereof, where the network includes the NTN, and where the receiving of the first message indicating that the UE is assigned the first WUS configuration that corresponds to the geographic area is based on the transmitting of the second message.

In some examples, the second message includes an NAS message or an RRC message.

Figure 8:
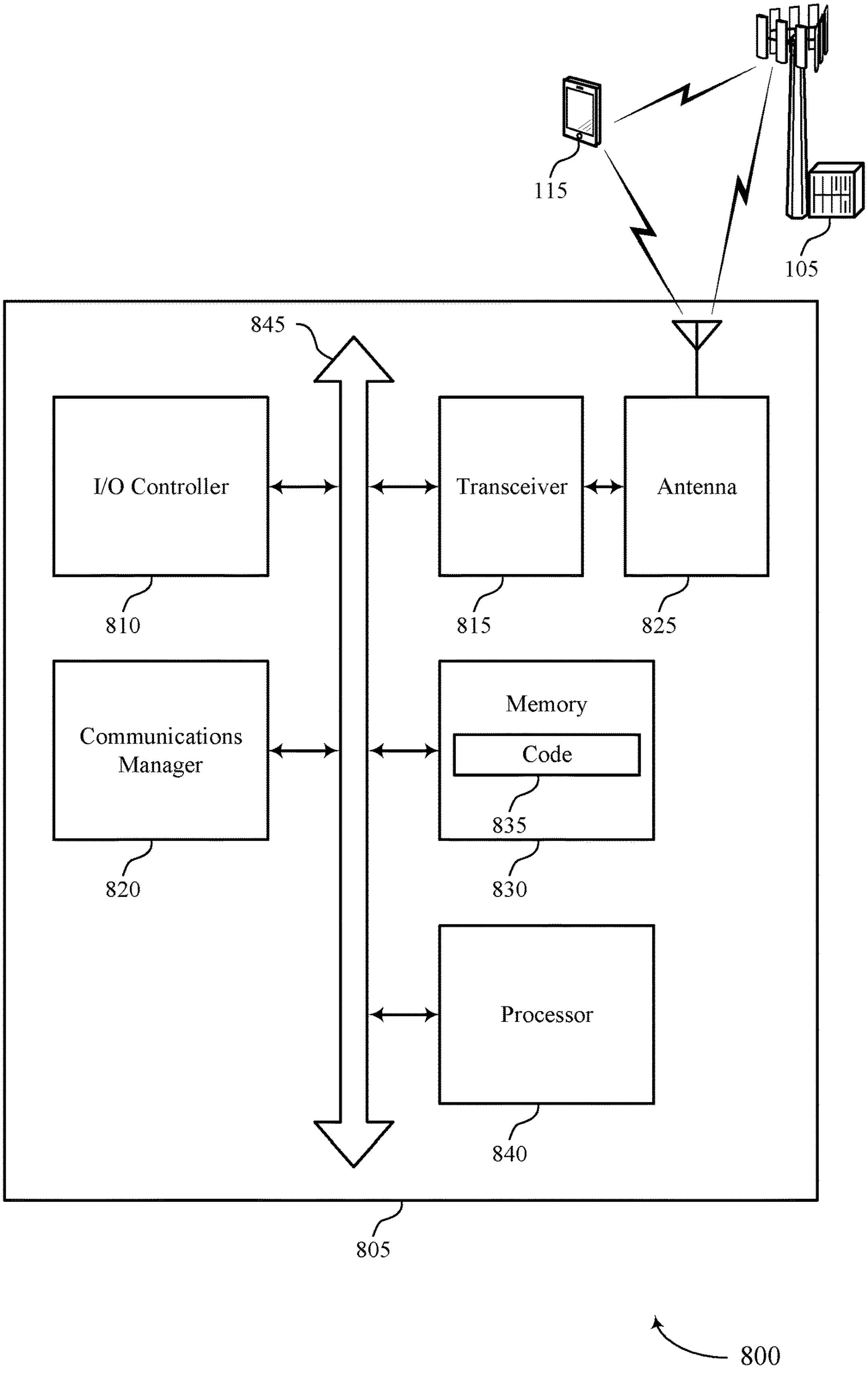
FIG. 8 shows a diagram of a system including a device that supports location based WUS in accordance with aspects of the present disclosure.

FIG. 8 shows a diagram of a system 800 including a device 805 that supports location based WUS in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting location based WUS). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a first network entity of an NTN, a first message indicating a location parameter associated with a WUS configuration. The communications manager 820 may be configured as or otherwise support a means for determining that the UE is located within a geographic area associated with the location parameter based on the receiving of the first message. The communications manager 820 may be configured as or otherwise support a means for monitoring for a first WUS from the first network entity based on the determining that the UE is located within the geographic area.

Additionally or alternatively, the communications manager 820 may support wireless communications at a UE in accordance with examples as disclosed herein. For example, the communications manager 820 may be configured as or otherwise support a means for receiving, from a first network entity of an NTN, a first message indicating a first WUS configuration that indicates that the UE is assigned a WUS group identity, where the WUS group identity is associated with a geographic area. The communications manager 820 may be configured as or otherwise support a means for monitoring for a first WUS from the first network entity based on the WUS group identity included in the first message, where a first WUS group corresponds to the first WUS configuration.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of location based WUS as described herein, or the processor 840 and the memory 830 may be otherwise configured to perform or support such operations.

Figure 9:
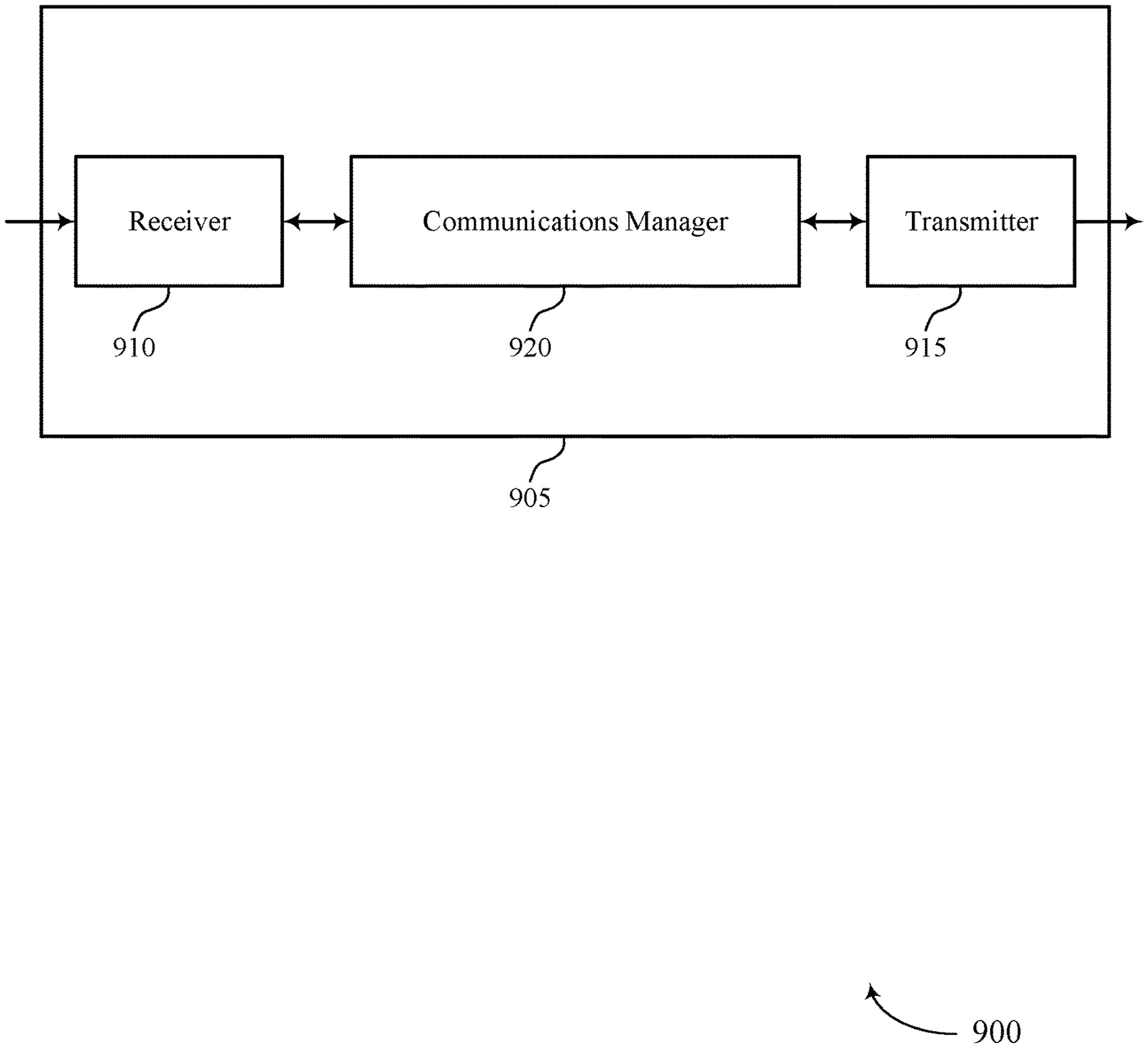
FIGS. 9 and 10 show block diagrams of devices that support location based WUS in accordance with aspects of the present disclosure.

FIG. 9 shows a block diagram 900 of a device 905 that supports location based WUS in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to location based WUS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to location based WUS). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of location based WUS as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network entity of an NTN in accordance with examples as disclosed herein. For example, the communications manager 920 may be configured as or otherwise support a means for transmitting, to a UE, a first message indicating a location parameter associated with a WUS configuration. The communications manager 920 may be configured as or otherwise support a means for transmitting, to the UE, a WUS that corresponds to the location parameter.

Additionally or alternatively, the communications manager 920 may support wireless communications at a network entity of an NTN in accordance with examples as disclosed herein. For example, the communications manager 920 may be configured as or otherwise support a means for transmitting, to a UE, a first message indicating a first WUS configuration that indicates that the UE is assigned a WUS group identity, where the WUS group identity is associated with a geographic area. The communications manager 920 may be configured as or otherwise support a means for transmitting, to the UE, a first WUS to alert the UE of a mobile terminated paging call, where a first WUS group corresponds to the first WUS configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
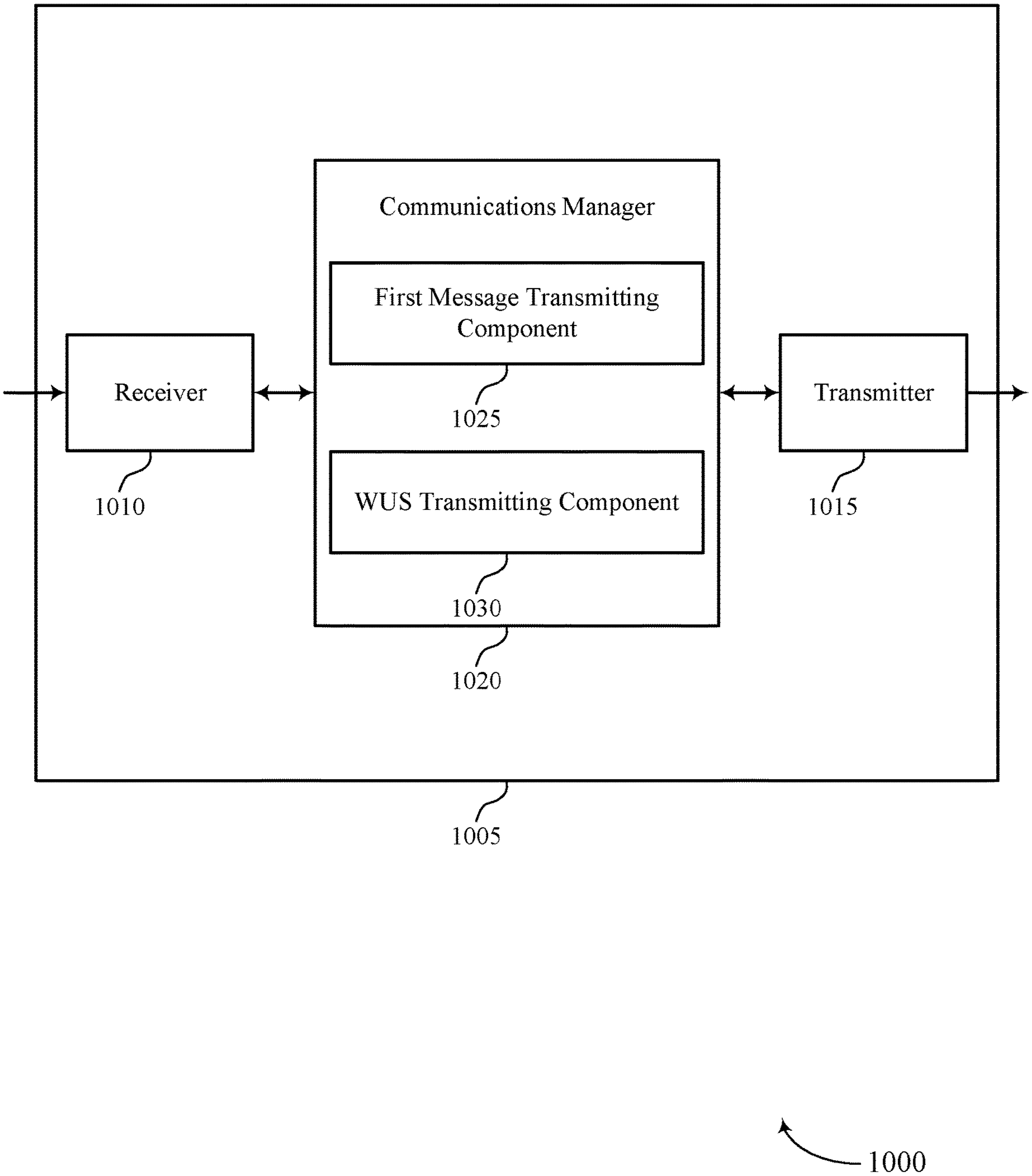

FIG. 10 shows a block diagram 1000 of a device 1005 that supports location based WUS in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to location based WUS). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to location based WUS). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of location based WUS as described herein. For example, the communications manager 1020 may include a first message transmitting component 1025, a WUS transmitting component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network entity of an NTN in accordance with examples as disclosed herein. The first message transmitting component 1025 may be configured as or otherwise support a means for transmitting, to a UE, a first message indicating a location parameter associated with a WUS configuration. The WUS transmitting component 1030 may be configured as or otherwise support a means for transmitting, to the UE, a WUS that corresponds to the location parameter.

Additionally or alternatively, the communications manager 1020 may support wireless communications at a network entity of an NTN in accordance with examples as disclosed herein. The first message transmitting component 1025 may be configured as or otherwise support a means for transmitting, to a UE, a first message indicating a first WUS configuration that indicates that the UE is assigned a WUS group identity, where the WUS group identity is associated with a geographic area. The WUS transmitting component 1030 may be configured as or otherwise support a means for transmitting, to the UE, a first WUS to alert the UE of a mobile terminated paging call, where a first WUS group corresponds to the first WUS configuration.

Figure 11:
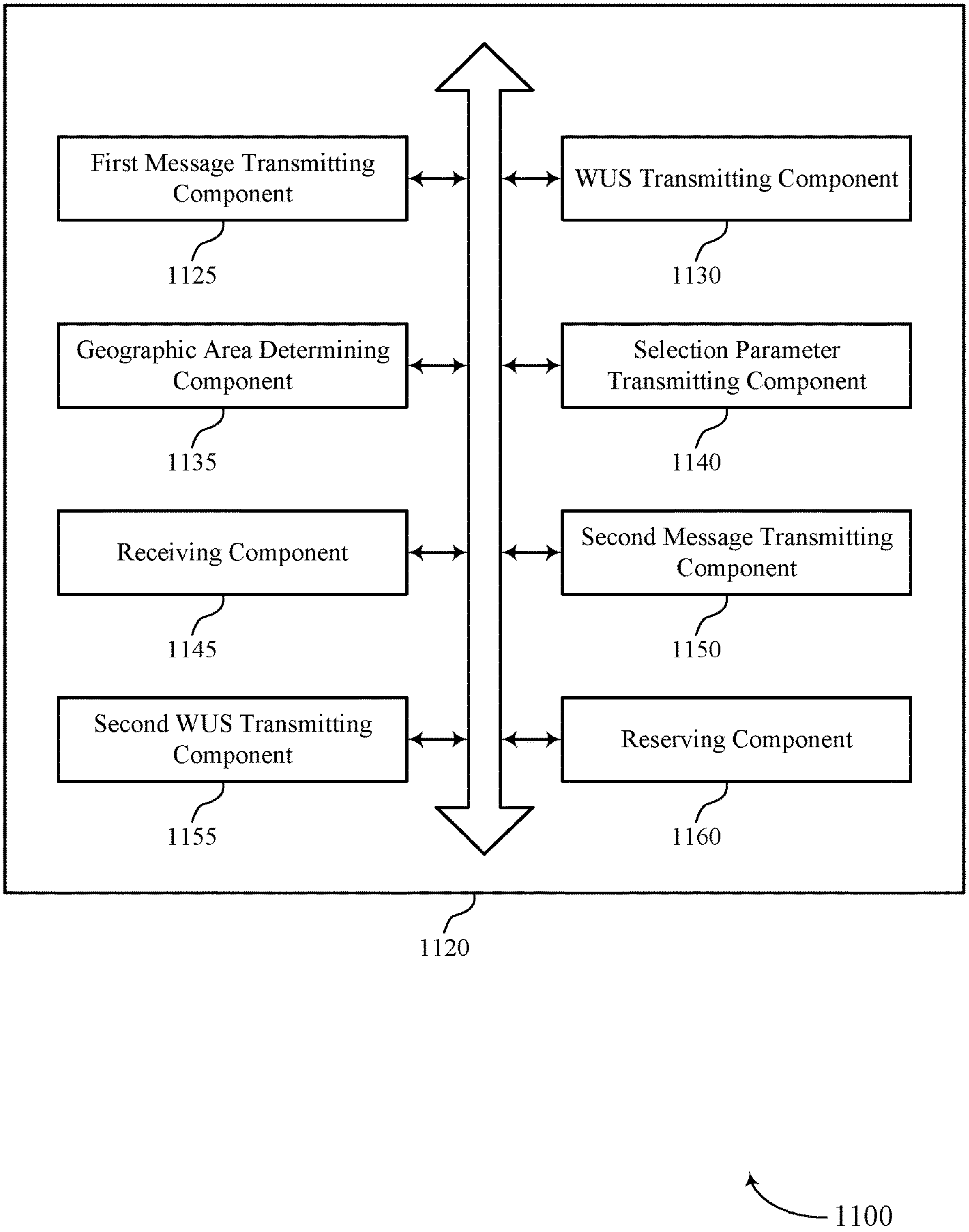
FIG. 11 shows a block diagram of a communications manager that supports location based WUS in accordance with aspects of the present disclosure.

FIG. 11 shows a block diagram 1100 of a communications manager 1120 that supports location based WUS in accordance with aspects of the present disclosure. The communications manager 1120 may be an example of aspects of a communications manager 920, a communications manager 1020, or both, as described herein. The communications manager 1120, or various components thereof, may be an example of means for performing various aspects of location based WUS as described herein. For example, the communications manager 1120 may include a first message transmitting component 1125, a WUS transmitting component 1130, a geographic area determining component 1135, a selection parameter transmitting component 1140, a receiving component 1145, a second message transmitting component 1150, a second WUS transmitting component 1155, a reserving component 1160, or any combination thereof. Each of these components may communicate, directly or indirectly, with one another (e.g., via one or more buses).

The communications manager 1120 may support wireless communications at a network entity of an NTN in accordance with examples as disclosed herein. The first message transmitting component 1125 may be configured as or otherwise support a means for transmitting, to a UE, a first message indicating a location parameter associated with a WUS configuration. The WUS transmitting component 1130 may be configured as or otherwise support a means for transmitting, to the UE, a WUS that corresponds to the location parameter. In some examples, the location parameter includes a cell identifier, a reference location associated with a geographic area, a radius, or any combination thereof.

In some examples, the geographic area determining component 1135 may be configured as or otherwise support a means for determining a geographic area associated with the WUS and associated with the location parameter, where the geographic area is defined by one or more WUS registration areas, one or more GNSS coordinates, one or more TACs, one or more virtual cell IDs, one or more zone IDs, one or more geo-fencing parameters, or any combination thereof. In some examples, the one or more WUS registration areas each include one or more second TACs, or one or more second virtual cell IDs, one or more second zone IDs, one more second cell identities, or any combination thereof.

In some examples, the selection parameter transmitting component 1140 may be configured as or otherwise support a means for transmitting, to the UE, a selection parameter that corresponds to a geographic area associated with the location parameter and that indicates a set of resources used by the WUS, the WUS configuration including the set of resources.

In some examples, the selection parameter transmitting component 1140 may be configured as or otherwise support a means for transmitting, to the UE, a selection parameter that corresponds to a geographic area associated with the location parameter and that indicates a signal group identity used by the WUS.

In some examples, the receiving component 1145 may be configured as or otherwise support a means for receiving, from the UE, a second message indicating one or more preferences for a geographic area associated with the WUS and associated with the location parameter, a capability to use the geographic area, location information, or any combination thereof, where the transmitting of the first message indicating the location parameter associated with the WUS configuration is based on the receiving of the second message.

In some examples, the second message includes an NAS message or an RRC message.

In some examples, the first message includes an RRC message, an RRC release message, or a dedicated RRC message.

Additionally or alternatively, the communications manager 1120 may support wireless communications at a network entity of an NTN in accordance with examples as disclosed herein. In some examples, the first message transmitting component 1125 may be configured as or otherwise support a means for transmitting, to a UE, a first message indicating a first WUS configuration that indicates that the UE is assigned a WUS group identity, where the WUS group identity is associated with a geographic area. In some examples, the WUS transmitting component 1130 may be configured as or otherwise support a means for transmitting, to the UE, a first WUS to alert the UE of a mobile terminated paging call, where a first WUS group corresponds to the first WUS configuration.

In some examples, the second message transmitting component 1150 may be configured as or otherwise support a means for transmitting, to the UE, a second message indicating that the network entity uses the first WUS group to alert UEs in the geographic area, where the second message is transmitted in a broadcast message. In some examples, the transmitting the second message indicating that the network entity uses the first WUS configuration to alert UEs in the geographic area is based on the network entity being located above the geographic area.

In some examples, the second WUS transmitting component 1155 may be configured as or otherwise support a means for transmitting, to the UE, a second WUS corresponding to a second WUS configuration that is independent of the geographic area.

In some examples, the selection parameter transmitting component 1140 may be configured as or otherwise support a means for transmitting, to the UE, a first selection parameter that indicates a set of resources used by the first WUS, a second selection parameter that indicates a signal group identity used by the first WUS, or both, the first selection parameter and the second selection parameter corresponding to the geographic area.

In some examples, the geographic area determining component 1135 may be configured as or otherwise support a means for determining the geographic area associated with the first WUS, where the geographic area associated with the first WUS is defined by one or more WUS registration areas, one or more GNSS coordinates, one or more TACs, one or more virtual cell IDs, one or more zone IDs, one or more geo-fencing parameters, or any combination thereof. In some examples, the one or more WUS registration areas each include one or more second TACs, or one or more second virtual cell IDs, one or more second zone IDs, one more second cell identities, or any combination thereof.

In some examples, the receiving component 1145 may be configured as or otherwise support a means for receiving, from the UE, a second message indicating one or more preferences for the geographic area associated with the first WUS, a capability to use the geographic area associated with the first WUS, location information, or any combination thereof, and where the transmitting of the first message indicating that the UE is assigned the first WUS configuration that corresponds to the geographic area is based on the receiving of the second message.

In some examples, the second message includes an NAS message or an RRC message. In some examples, the first message includes an NAS message or an RRC message, an RRC release message, or a dedicated RRC message.

In some examples, the reserving component 1160 may be configured as or otherwise support a means for reserving one or more second WUS groups based on the transmitting the first message.

Figure 12:
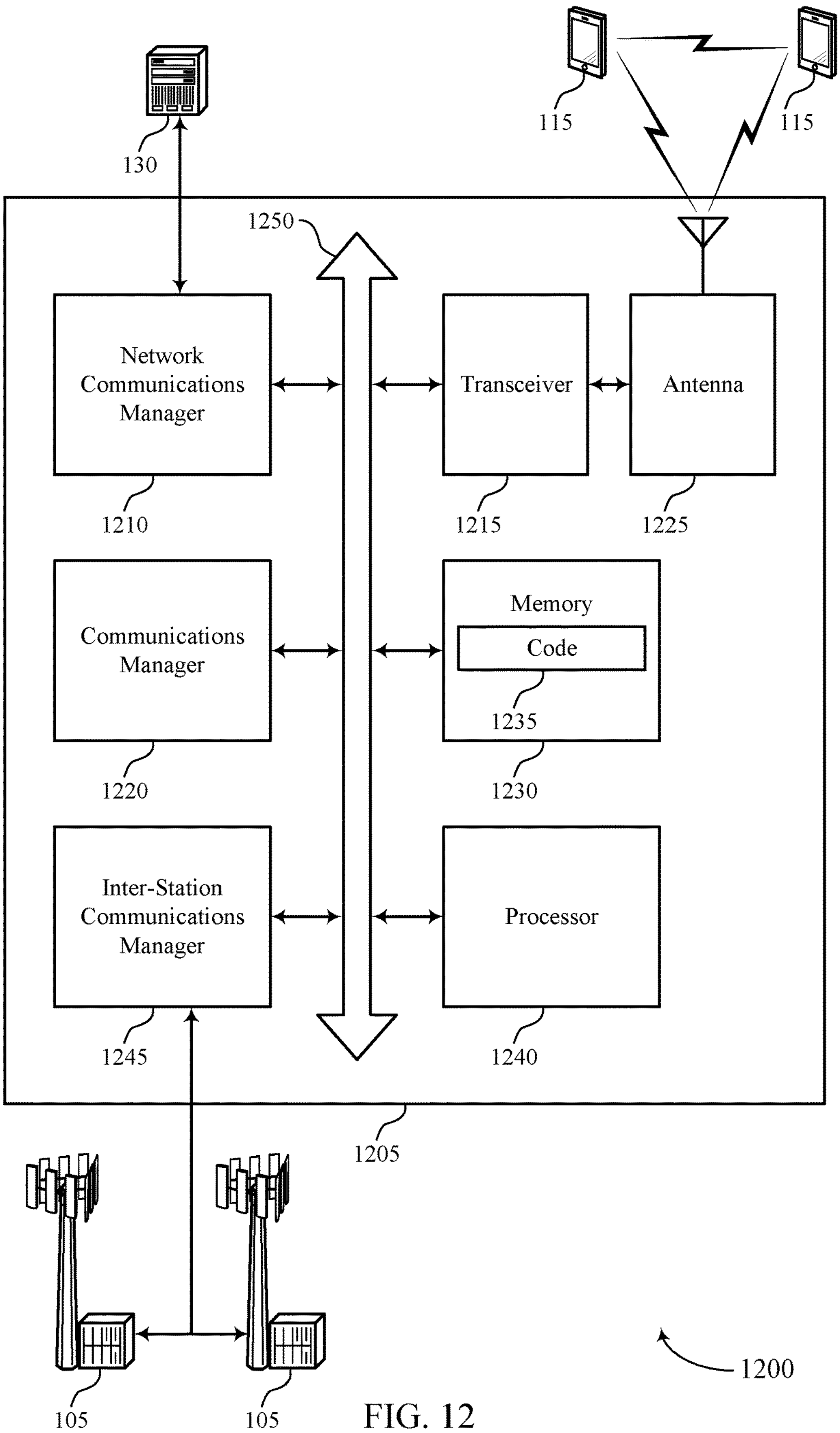
FIG. 12 shows a diagram of a system including a device that supports location based WUS in accordance with aspects of the present disclosure.

FIG. 12 shows a diagram of a system 1200 including a device 1205 that supports location based WUS in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting location based WUS). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a network entity of an NTN in accordance with examples as disclosed herein. For example, the communications manager 1220 may be configured as or otherwise support a means for transmitting, to a UE, a first message indicating a location parameter associated with a WUS configuration. The communications manager 1220 may be configured as or otherwise support a means for transmitting, to the UE, a WUS that corresponds to the location parameter.

Additionally or alternatively, the communications manager 1220 may support wireless communications at a network entity of an NTN in accordance with examples as disclosed herein. For example, the communications manager 1220 may be configured as or otherwise support a means for transmitting, to a UE, a first message indicating a first WUS configuration that indicates that the UE is assigned a WUS group identity, where the WUS group identity is associated with a geographic area. The communications manager 1220 may be configured as or otherwise support a means for transmitting, to the UE, a first WUS to alert the UE of a mobile terminated paging call, where a first WUS group corresponds to the first WUS configuration.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of location based WUS as described herein, or the processor 1240 and the memory 1230 may be otherwise configured to perform or support such operations.

Figure 13:
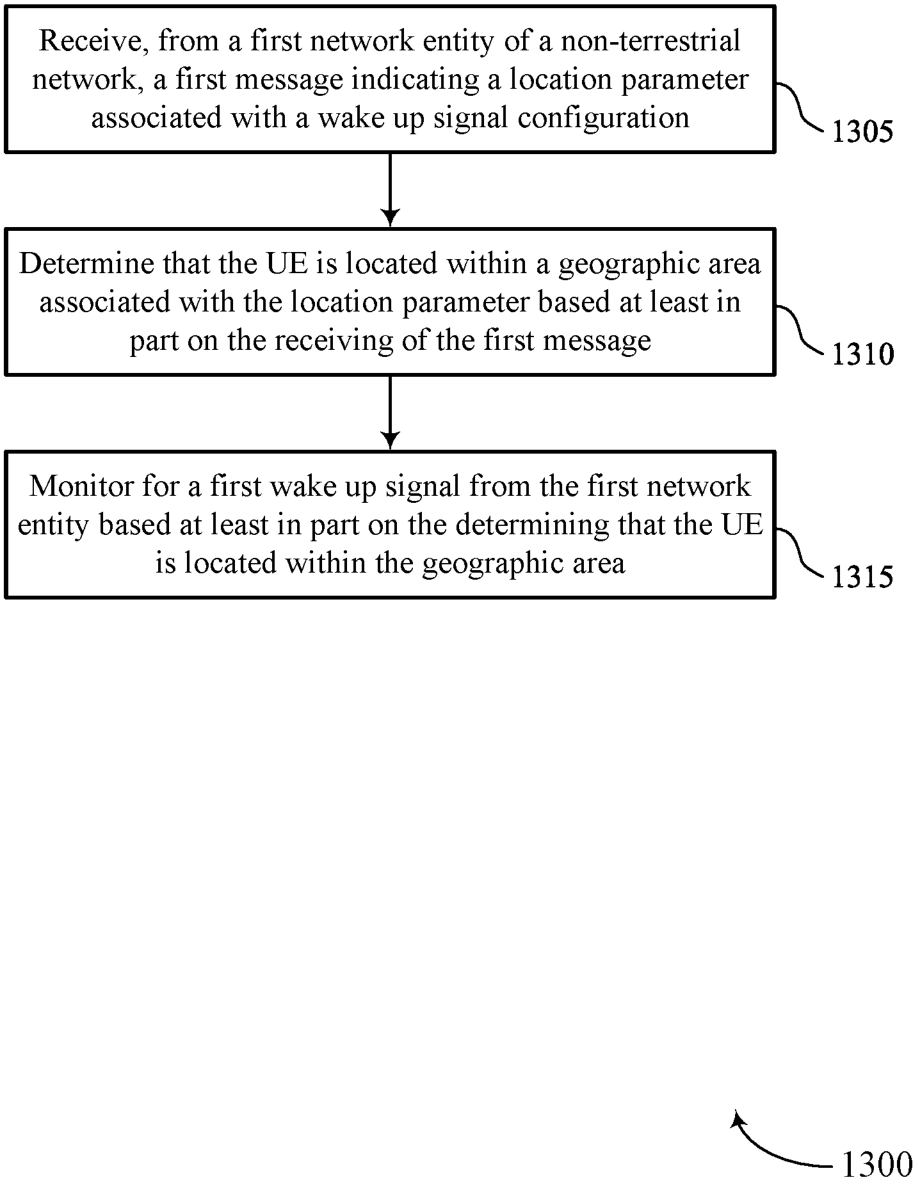
FIGS. 13 through 18 show flowcharts illustrating methods that support location based WUS in accordance with aspects of the present disclosure.

FIG. 13 shows a flowchart illustrating a method 1300 that supports location based WUS in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a first network entity of an NTN, a first message indicating a location parameter associated with a WUS configuration. The operations of 1305 may be performed in accordance with examples as disclosed herein. In some examples, aspects of the operations of 1305 may be performed by a receiving component 725 as described with reference to FIG. 7.

At 1310, the method may include determining that the UE is located within a geographic area associated with the location parameter based on the receiving of the first message. The operations of 1310 may be performed in accordance with examples as disclosed herein. In some examples, aspects of the operations of 1310 may be performed by a geographic area determining component 730 as described with reference to FIG. 7.

At 1315, the method may include monitoring for a first WUS from the first network entity based on the determining that the UE is located within the geographic area. The operations of 1315 may be performed in accordance with examples as disclosed herein. In some examples, aspects of the operations of 1315 may be performed by a monitoring component 735 as described with reference to FIG. 7.

Figure 14:
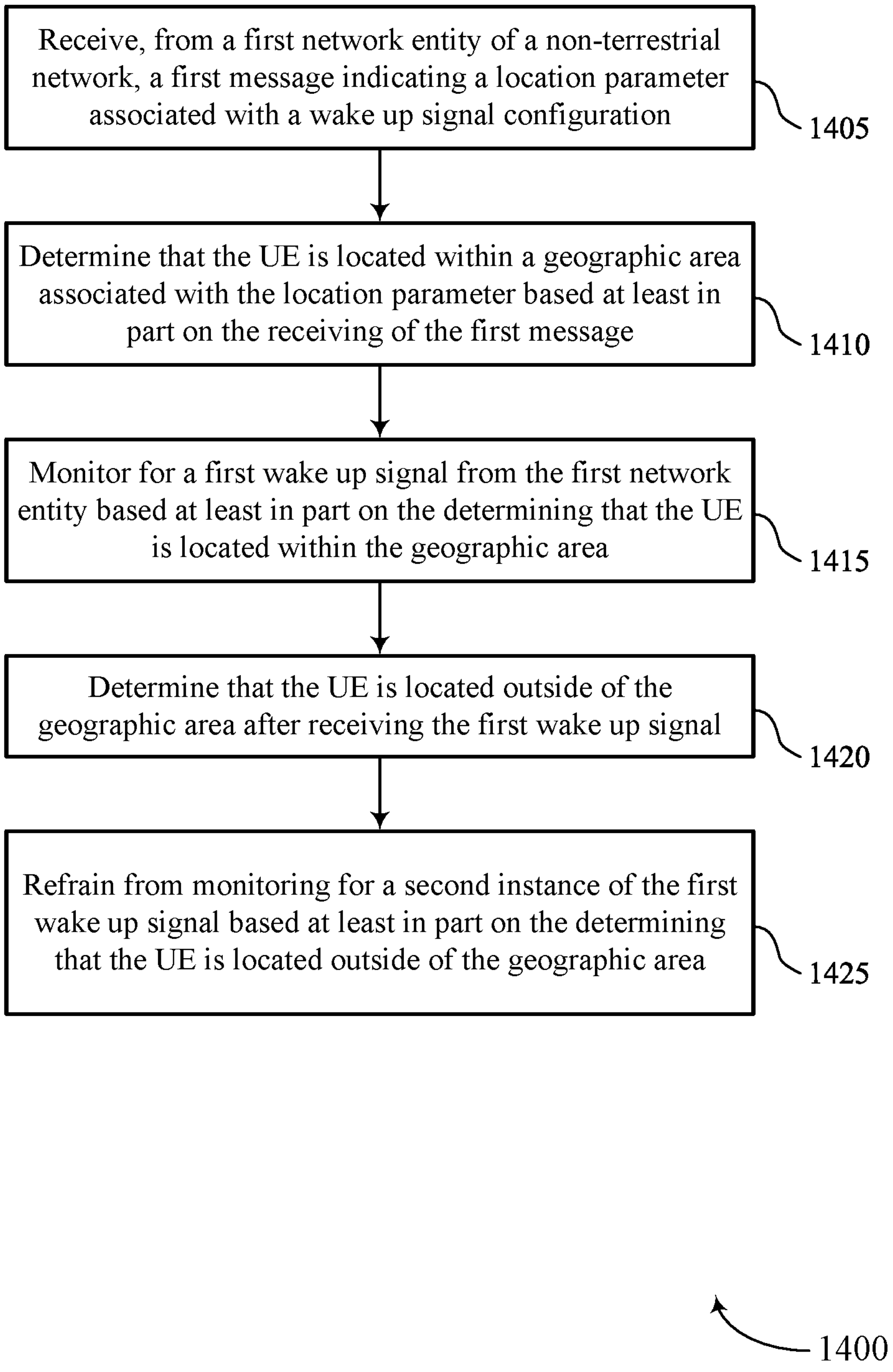

FIG. 14 shows a flowchart illustrating a method 1400 that supports location based WUS in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a first network entity of an NTN, a first message indicating a location parameter associated with a WUS configuration. The operations of 1405 may be performed in accordance with examples as disclosed herein. In some examples, aspects of the operations of 1405 may be performed by a receiving component 725 as described with reference to FIG. 7.

At 1410, the method may include determining that the UE is located within a geographic area associated with the location parameter based on the receiving of the first message. The operations of 1410 may be performed in accordance with examples as disclosed herein. In some examples, aspects of the operations of 1410 may be performed by a geographic area determining component 730 as described with reference to FIG. 7.

At 1415, the method may include monitoring for a first WUS from the first network entity based on the determining that the UE is located within the geographic area. The operations of 1415 may be performed in accordance with examples as disclosed herein. In some examples, aspects of the operations of 1415 may be performed by a monitoring component 735 as described with reference to FIG. 7.

At 1420, the method may include determining that the UE is located outside of the geographic area after receiving the first WUS. The operations of 1420 may be performed in accordance with examples as disclosed herein. In some examples, aspects of the operations of 1420 may be performed by a geographic area determining component 730 as described with reference to FIG. 7.

At 1425, the method may include refraining from monitoring for a second instance of the first WUS based on the determining that the UE is located outside of the geographic area. The operations of 1425 may be performed in accordance with examples as disclosed herein. In some examples, aspects of the operations of 1425 may be performed by a monitoring component 735 as described with reference to FIG. 7.

Figure 15:
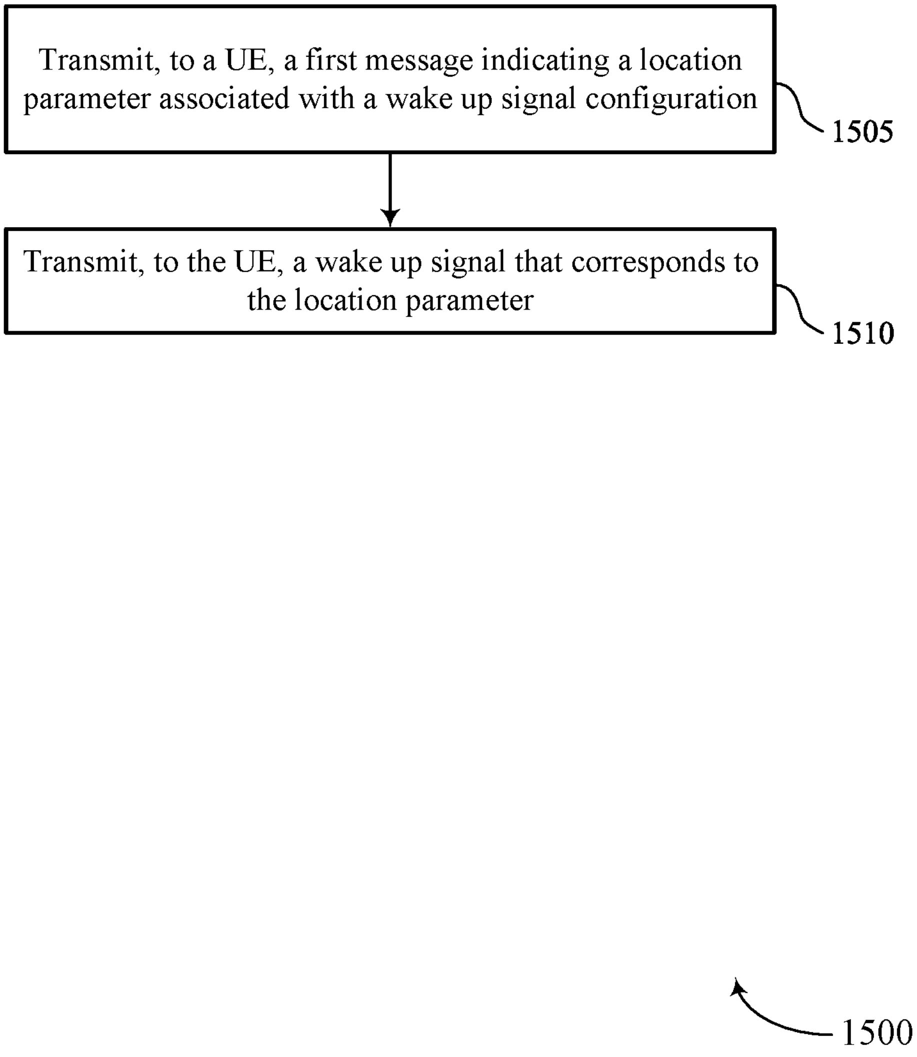

FIG. 15 shows a flowchart illustrating a method 1500 that supports location based WUS in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a first message indicating a location parameter associated with a WUS configuration. The operations of 1505 may be performed in accordance with examples as disclosed herein. In some examples, aspects of the operations of 1505 may be performed by a first message transmitting component 1125 as described with reference to FIG. 11.

At 1510, the method may include transmitting, to the UE, a WUS that corresponds to the location parameter. The operations of 1510 may be performed in accordance with examples as disclosed herein. In some examples, aspects of the operations of 1510 may be performed by a WUS transmitting component 1130 as described with reference to FIG. 11.

Figure 16:
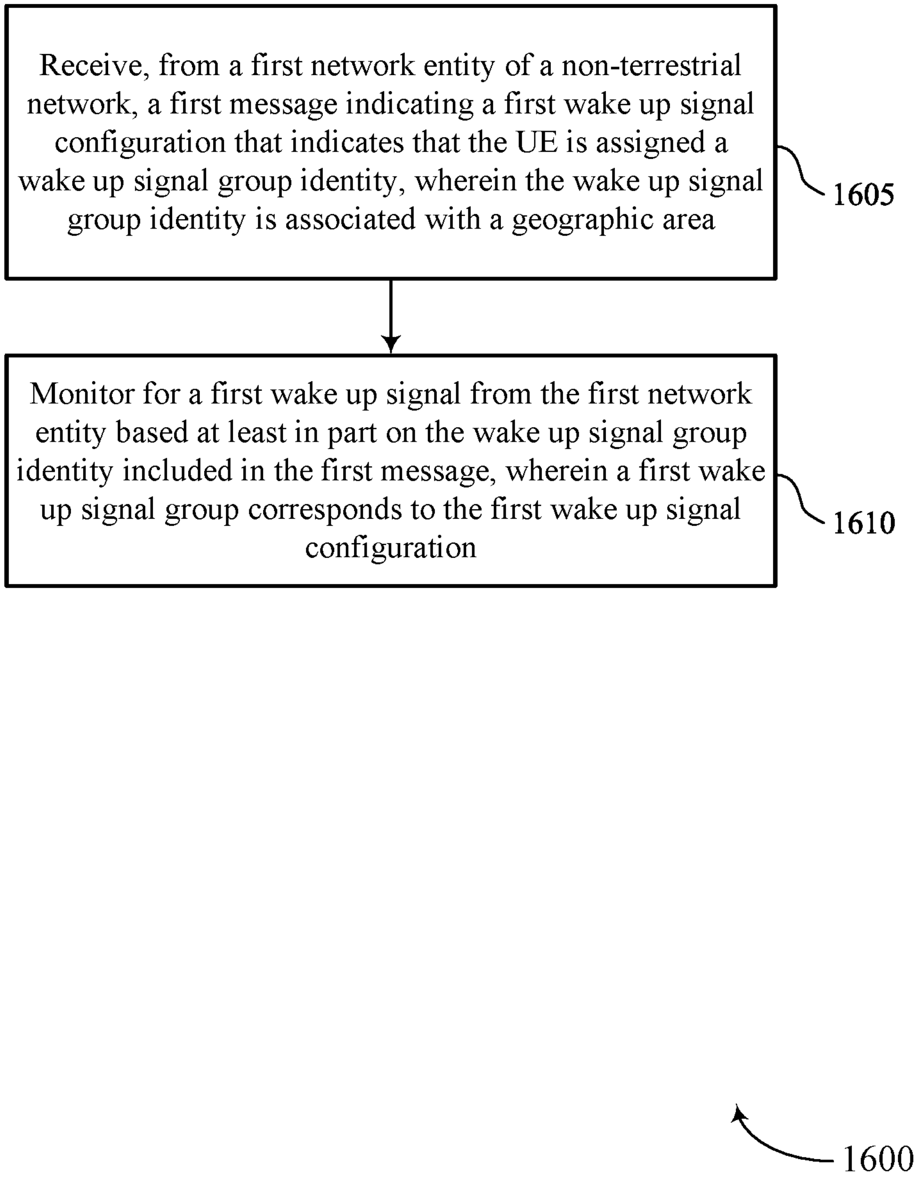

FIG. 16 shows a flowchart illustrating a method 1600 that supports location based WUS in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a first network entity of an NTN, a first message indicating a first WUS configuration that indicates that the UE is assigned a WUS group identity, where the WUS group identity is associated with a geographic area. The operations of 1605 may be performed in accordance with examples as disclosed herein. In some examples, aspects of the operations of 1605 may be performed by a receiving component 725 as described with reference to FIG. 7.

At 1610, the method may include monitoring for a first WUS from the first network entity based on the WUS group identity included in the first message, where a first WUS group corresponds to the first WUS configuration. The operations of 1610 may be performed in accordance with examples as disclosed herein. In some examples, aspects of the operations of 1610 may be performed by a monitoring component 735 as described with reference to FIG. 7.

Figure 17:
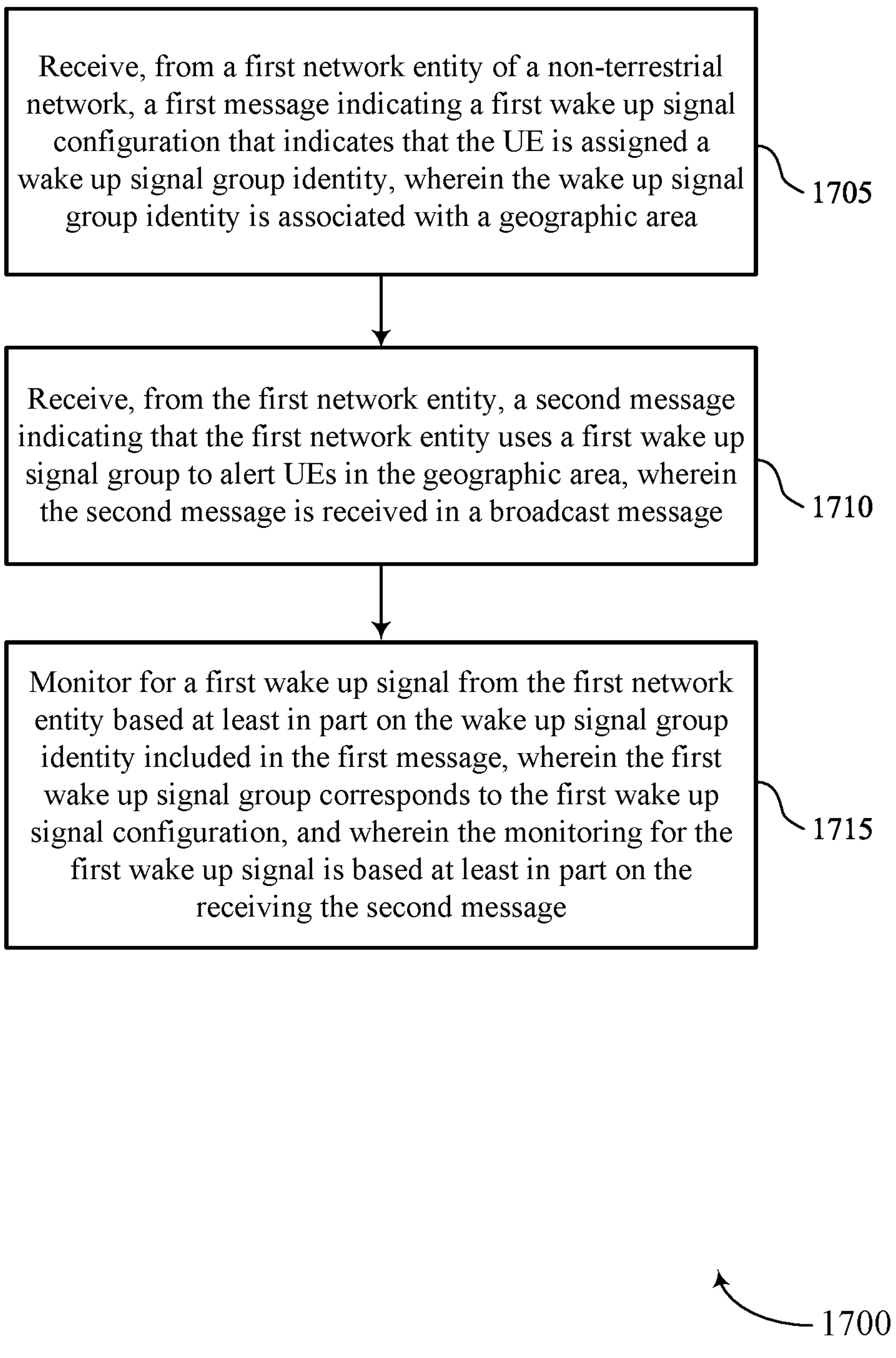

FIG. 17 shows a flowchart illustrating a method 1700 that supports location based WUS in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a first network entity of an NTN, a first message indicating a first WUS configuration that indicates that the UE is assigned a WUS group identity, where the WUS group identity is associated with a geographic area. The operations of 1705 may be performed in accordance with examples as disclosed herein. In some examples, aspects of the operations of 1705 may be performed by a receiving component 725 as described with reference to FIG. 7.

At 1710, the method may include receiving, from the first network entity, a second message indicating that the first network entity uses a first WUS group to alert UEs in the geographic area, where the second message is received in a broadcast message. The operations of 1710 may be performed in accordance with examples as disclosed herein. In some examples, aspects of the operations of 1710 may be performed by a receiving component 725 as described with reference to FIG. 7.

At 1715, the method may include monitoring for a first WUS from the first network entity based on the WUS group identity included in the first message, where the first WUS group corresponds to the first WUS configuration, and where the monitoring for the first WUS is based on the receiving the second message. The operations of 1715 may be performed in accordance with examples as disclosed herein. In some examples, aspects of the operations of 1715 may be performed by a monitoring component 735 as described with reference to FIG. 7.

Figure 18:
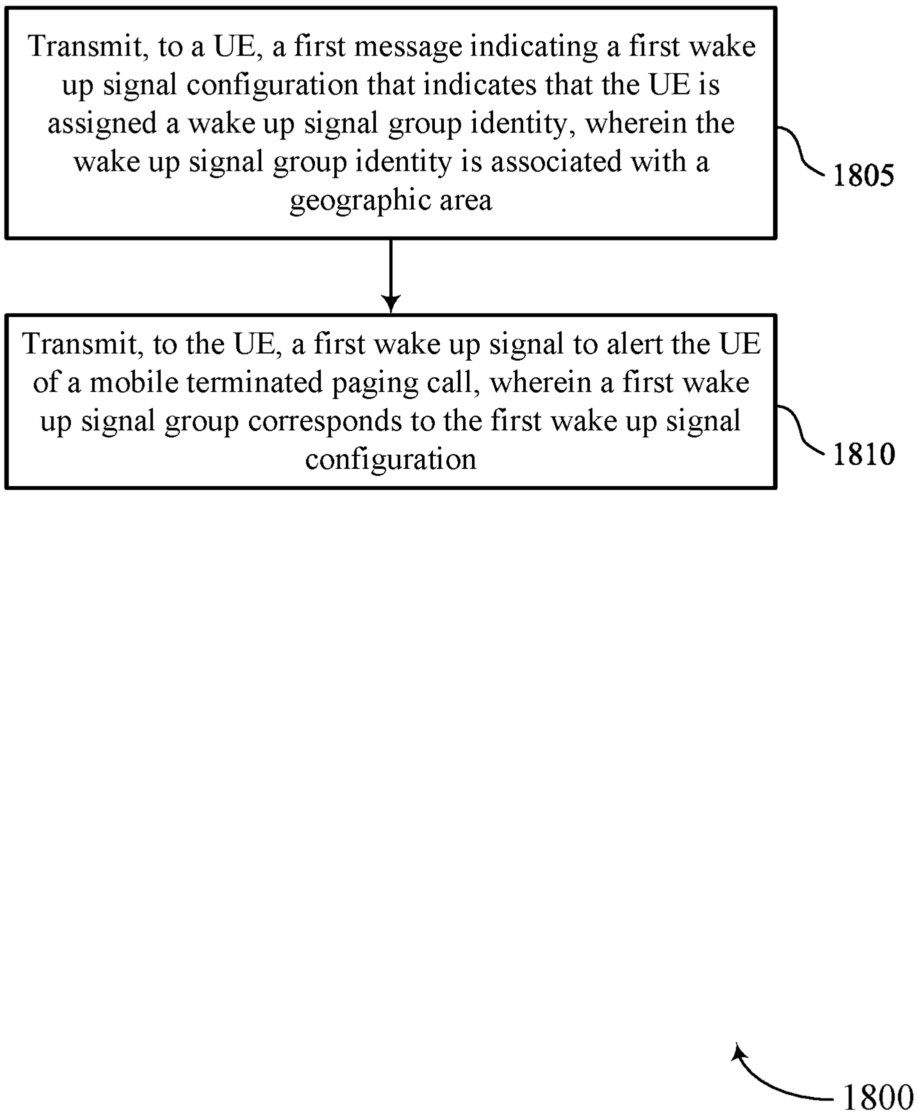

FIG. 18 shows a flowchart illustrating a method 1800 that supports location based WUS in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a first message indicating a first WUS configuration that indicates that the UE is assigned a WUS group identity, where the WUS group identity is associated with a geographic area. The operations of 1805 may be performed in accordance with examples as disclosed herein. In some examples, aspects of the operations of 1805 may be performed by a first message transmitting component 1125 as described with reference to FIG. 11.

At 1810, the method may include transmitting, to the UE, a first WUS to alert the UE of a mobile terminated paging call, where a first WUS group corresponds to the first WUS configuration. The operations of 1810 may be performed in accordance with examples as disclosed herein. In some examples, aspects of the operations of 1810 may be performed by a WUS transmitting component 1130 as described with reference to FIG. 11.

The following provides an overview of aspects of the present disclosure:

Aspect 1: A method for wireless communications at a UE, comprising: receiving, from a first network entity of an NTN, a first message indicating a location parameter associated with a WUS configuration; determining that the UE is located within a geographic area associated with the location parameter based at least in part on the receiving of the first message; and monitoring for a first WUS from the first network entity based at least in part on the determining that the UE is located within the geographic area.

Aspect 2: The method of aspect 1, further comprising: monitoring for a second WUS from a second network entity of the NTN based at least in part on the determining that the UE is located within the geographic area.

Aspect 3: The method of any of aspects 1 through 2, further comprising: determining that the UE is located outside of the geographic area after monitoring for the first WUS; and refraining from monitoring for a second instance of the first WUS based at least in part on the determining that the UE is located outside of the geographic area.

Aspect 4: The method of any of aspects 1 through 3, wherein the location parameter comprises a cell identifier, a reference location associated with the geographic area, a radius, or any combination thereof.

Aspect 5: The method of any of aspects 1 through 4, wherein the determining that the UE is located within the geographic area associated with the location parameter comprises: determining that the UE is located within a radius distance from a reference location.

Aspect 6: The method of any of aspects 1 through 5, further comprising: receiving, from the first network entity, a selection parameter that corresponds to the geographic area and indicates a set of resources used by the first WUS, the WUS configuration comprising the set of resources; and determining to use the set of resources based at least in part on the selection parameter, wherein the monitoring for the first WUS is based at least in part on the set of resources.

Aspect 7: The method of any of aspects 1 through 6, further comprising: receiving, from the first network entity, a selection parameter that corresponds to the geographic area and indicates a signal group identity used by the first WUS; and determining to use the signal group identity based at least in part on the selection parameter, wherein the monitoring for the first WUS is based at least in part on the signal group identity.

Aspect 8: The method of any of aspects 1 through 7, wherein the geographic area associated with the location parameter for the first WUS is defined by one or more WUS registration areas, one or more GNSS coordinates, one or more TACs, one or more virtual cell IDs, one or more zone IDs, one or more geo-fencing parameters, or any combination thereof.

Aspect 9: The method of aspect 8, wherein the one or more WUS registration areas each comprise one or more second TACs, or one or more second virtual cell IDs, one or more second zone IDs, one more second cell identities, or any combination thereof.

Aspect 10: The method of any of aspects 1 through 9, further comprising: transmitting, to a network device of a network, a second message indicating one or more preferences for the geographic area associated with the first WUS, a capability to use the geographic area associated with the first WUS, location information, or any combination thereof, wherein the network comprises the NTN, and wherein the receiving of the first message indicating the location parameter associated with the WUS configuration is based at least in part on the transmitting of the second message.

Aspect 11: The method of aspect 10, wherein the second message comprises an NAS message or an RRC message.

Aspect 12: The method of any of aspects 1 through 11, wherein the first message comprises an RRC message.

Aspect 13: The method of any of aspects 1 through 12, wherein the first network entity comprises a first cell.

Aspect 14: A method for wireless communications at a network entity of an NTN, comprising: transmitting, to a UE, a first message indicating a location parameter associated with a WUS configuration; and transmitting, to the UE, a WUS that corresponds to the location parameter.

Aspect 15: The method of aspect 14, wherein the location parameter comprises a cell identifier, a reference location associated with a geographic area, a radius, or any combination thereof.

Aspect 16: The method of any of aspects 14 through 15, further comprising: determining a geographic area associated with the WUS and associated with the location parameter, wherein the geographic area is defined by one or more WUS registration areas, one or more GNSS coordinates, one or more TACs, one or more virtual cell IDs, one or more zone IDs, one or more geo-fencing parameters, or any combination thereof.

Aspect 17: The method of aspect 16, wherein the one or more WUS registration areas each comprise one or more second TACs, or one or more second virtual cell IDs, one or more second zone IDs, one more second cell identities, or any combination thereof.

Aspect 18: The method of any of aspects 14 through 17, further comprising: transmitting, to the UE, a selection parameter that corresponds to a geographic area associated with the location parameter and that indicates a set of resources used by the WUS, the WUS configuration comprising the set of resources.

Aspect 19: The method of any of aspects 14 through 18, further comprising: transmitting, to the UE, a selection parameter that corresponds to a geographic area associated with the location parameter and that indicates a signal group identity used by the WUS.

Aspect 20: The method of any of aspects 14 through 19, further comprising: receiving, from the UE, a second message indicating one or more preferences for a geographic area associated with the WUS and associated with the location parameter, a capability to use the geographic area, location information, or any combination thereof, wherein the transmitting of the first message indicating the location parameter associated with the WUS configuration is based at least in part on the receiving of the second message.

Aspect 21: The method of aspect 20, wherein the second message comprises an NAS message or an RRC message.

Aspect 22: The method of any of aspects 14 through 21, wherein the first message comprises an RRC message.

Aspect 23: A method for wireless communications at a UE, comprising: receiving, from a first network entity of an NTN, a first message indicating a first WUS configuration that indicates that the UE is assigned a WUS group identity, wherein the WUS group identity is associated with a geographic area; and monitoring for a first WUS from the first network entity based at least in part on the WUS group identity included in the first message, wherein a first WUS group corresponds to the first WUS configuration.

Aspect 24: The method of aspect 23, further comprising: receiving, from the first network entity, a second message indicating that the first network entity uses the first WUS group to alert UEs in the geographic area, wherein the monitoring for the first WUS is based at least in part on the receiving the second message, wherein the second message is received in a broadcast message.

Aspect 25: The method of any of aspects 23 through 24, wherein the first message comprises an NAS message or an RRC message.

Aspect 26: The method of any of aspects 23 through 25, further comprising: receiving, from a second network entity of the NTN, a second message indicating that the second network entity uses the first WUS configuration to alert UEs; and monitoring for a second WUS group identity from the second network entity based at least in part on the first WUS configuration included in the second message, wherein the second WUS group identity corresponds to the first WUS configuration.

Aspect 27: The method of any of aspects 23 through 26, further comprising: monitoring for a second WUS from the first network entity based at least in part on a second WUS configuration that is independent of the geographic area.

Aspect 28: The method of any of aspects 23 through 27, further comprising: receiving, from the first network entity, a selection parameter that corresponds to the geographic area and indicates a set of resources used by the first WUS, the first WUS configuration comprising the set of resources; and determining to use the set of resources based at least in part on the selection parameter, wherein the monitoring for the first WUS is based at least in part on the set of resources.

Aspect 29: The method of any of aspects 23 through 28, further comprising: receiving, from the first network entity, a selection parameter that corresponds to the geographic area and indicates a signal group identity used by the first WUS; and determining to use the signal group identity based at least in part on the selection parameter, wherein the monitoring for the first WUS is based at least in part on the signal group identity.

Aspect 30: The method of any of aspects 23 through 29, wherein the geographic area associated with the first WUS is defined by one or more WUS registration areas, one or more GNSS coordinates, one or more TACs, one or more virtual cell IDs, one or more zone IDs, one or more geo-fencing parameters, or any combination thereof.

Aspect 31: The method of aspect 30, wherein the one or more WUS registration areas each comprise one or more second TACs, or one or more second virtual cell IDs, one or more second zone IDs, one more second cell identities, or any combination thereof.

Aspect 32: The method of any of aspects 23 through 31, further comprising: transmitting, to a network device of a network, a second message indicating one or more preferences for the geographic area associated with the first WUS, a capability to use the geographic area associated with the first WUS, location information, or any combination thereof, wherein the network comprises the NTN, and wherein the receiving of the first message indicating that the UE is assigned the first WUS configuration that corresponds to the geographic area is based at least in part on the transmitting of the second message.

Aspect 33: The method of aspect 32, wherein the second message comprises an NAS message or an RRC message.

Aspect 34: A method for wireless communications at a network entity of an NTN, comprising: transmitting, to a UE, a first message indicating a first WUS configuration that indicates that the UE is assigned a WUS group identity, wherein the WUS group identity is associated with a geographic area; and transmitting, to the UE, a first WUS to alert the UE of a mobile terminated paging call, wherein a first WUS group corresponds to the first WUS configuration.

Aspect 35: The method of aspect 34, further comprising: transmitting, to the UE, a second message indicating that the network entity uses the first WUS group to alert UEs in the geographic area, wherein the second message is transmitted in a broadcast message.

Aspect 36: The method of aspect 35, wherein the transmitting the second message indicating that the network entity uses the first WUS configuration to alert UEs in the geographic area is based at least in part on the network entity being located above the geographic area.

Aspect 37: The method of any of aspects 34 through 36, further comprising: transmitting, to the UE, a second WUS corresponding to a second WUS configuration that is independent of the geographic area or that is common for all UEs.

Aspect 38: The method of any of aspects 34 through 37, further comprising: transmitting, to the UE, a first selection parameter that indicates a set of resources used by the first WUS, a second selection parameter that indicates a signal group identity used by the first WUS, or both, the first selection parameter and the second selection parameter corresponding to the geographic area.

Aspect 39: The method of any of aspects 34 through 38, further comprising: determining the geographic area associated with the first WUS, wherein the geographic area associated with the first WUS is defined by one or more WUS registration areas, one or more GNSS coordinates, one or more TACs, one or more virtual cell IDs, one or more zone IDs, one or more geo-fencing parameters, or any combination thereof.

Aspect 40: The method of aspect 39, wherein the one or more WUS registration areas each comprise one or more second TACs, or one or more second virtual cell IDs, one or more second zone IDs, one more second cell identities, or any combination thereof.

Aspect 41: The method of any of aspects 34 through 40, further comprising: receiving, from the UE, a second message indicating one or more preferences for the geographic area associated with the first WUS, a capability to use the geographic area associated with the first WUS, location information, or any combination thereof, and wherein the transmitting of the first message indicating that the UE is assigned the first WUS configuration that corresponds to the geographic area is based at least in part on the receiving of the second message.

Aspect 42: The method of aspect 41, wherein the second message comprises an NAS message or an RRC message.

Aspect 43: The method of any of aspects 34 through 42, wherein the first message comprises an NAS message or an RRC message.

Aspect 44: The method of any of aspects 34 through 43, further comprising: reserving one or more second WUS groups based at least in part on the transmitting the first message.

Aspect 45: An apparatus for wireless communications at a UE, comprising a processor; memory coupled with the processor; and instructions stored in the memory and executable by the processor to cause the apparatus to perform a method of any of aspects 1 through 13.

Aspect 46: An apparatus for wireless communications at a UE, comprising at least one means for performing a method of any of aspects 1 through 13.

Aspect 47: A non-transitory computer-readable medium storing code for wireless communications at a UE, the code comprising instructions executable by a processor to perform a method of any of aspects 1 through 13.

Aspect 48: An apparatus for wireless communications at a network entity of an NTN, comprising a processor; memory coupled with the processor; and instructions stored in the memory and executable by the processor to cause the apparatus to perform a method of any of aspects 14 through 22.

Aspect 49: An apparatus for wireless communications at a network entity of an NTN, comprising at least one means for performing a method of any of aspects 14 through 22.

Aspect 50: A non-transitory computer-readable medium storing code for wireless communications at a network entity of an NTN, the code comprising instructions executable by a processor to perform a method of any of aspects 14 through 22.

Aspect 51: An apparatus for wireless communications at a UE, comprising a processor; memory coupled with the processor; and instructions stored in the memory and executable by the processor to cause the apparatus to perform a method of any of aspects 23 through 33.

Aspect 52: An apparatus for wireless communications at a UE, comprising at least one means for performing a method of any of aspects 23 through 33.

Aspect 53: A non-transitory computer-readable medium storing code for wireless communications at a UE, the code comprising instructions executable by a processor to perform a method of any of aspects 23 through 33.

Aspect 54: An apparatus for wireless communications at a network entity of an NTN, comprising a processor; memory coupled with the processor; and instructions stored in the memory and executable by the processor to cause the apparatus to perform a method of any of aspects 34 through 44.

Aspect 55: An apparatus for wireless communications at a network entity of an NTN, comprising at least one means for performing a method of any of aspects 34 through 44.

Aspect 56: A non-transitory computer-readable medium storing code for wireless communications at a network entity of an NTN, the code comprising instructions executable by a processor to perform a method of any of aspects 34 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
- at least one processor;
- at least one memory coupled with the at least one processor; and
- instructions stored in the at least one memory and executable by the at least one processor to cause the UE to:
  - receive, from a first network entity of a non-terrestrial network, a first message indicating a location parameter associated with a wake up signal configuration, wherein the location parameter is indicative that the UE is located within a geographic area associated with the location parameter, and wherein the location parameter comprises a cell identifier, a reference location associated with the geographic area, a radius, or any combination thereof; and monitor for a first wake up signal from the first network entity based at least in part on the UE being located within the geographic area.

2. The UE of claim 1, wherein the instructions are further executable by the at least one processor to cause the UE to:

monitor for a second wake up signal from a second network entity of the non-terrestrial network based at least in part on the UE being located within the geographic area.

3. The UE of claim 1, wherein the instructions are further executable by the at least one processor to cause the UE to:

refrain from monitoring for a second instance of the first wake up signal based at least in part on the UE being located outside of the geographic area after monitoring the first wake up signal.

4. The UE of claim 1, wherein the UE is located within the geographic area associated with the location parameter in accordance with the UE being located within a radius distance from a reference location.

5. The UE of claim 1, wherein the instructions are further executable by the at least one processor to cause the UE to:

receive, from the first network entity, a selection parameter that corresponds to the geographic area and indicates a set of resources used by the first wake up signal, the wake up signal configuration comprising the set of resources wherein the first wake up signal is monitored via the set of resources based at least in part on the selection parameter.

6. The UE of claim 1, wherein the instructions are further executable by the at least one processor to cause the UE to:

receive, from the first network entity, a selection parameter that corresponds to the geographic area and indicates a signal group identity used by the first wake up signal wherein the first wake up signal is monitored via the signal group identity based at least in part on the selection parameter.

7. The UE of claim 1, wherein the geographic area associated with the location parameter for the first wake up signal is defined by one or more wake up signal registration areas, one or more global navigation satellite system coordinates, one or more tracking area codes (TACs), one or more virtual cell identifiers, one or more zone identifiers, one or more geo-fencing parameters, or any combination thereof.

8. The UE of claim 7, wherein the one or more wake up signal registration areas each comprise one or more second tracking area codes (TACs), or one or more second virtual cell identifiers, one or more second zone identifiers, one more second cell identities, or any combination thereof.

9. The UE of claim 1, wherein the instructions are further executable by the at least one processor to cause the UE to:

transmit, to a network device of a network, a second message indicating one or more preferences for the geographic area associated with the first wake up signal, a capability to use the geographic area associated with the first wake up signal, location information, or any combination thereof, wherein the network comprises the non-terrestrial network, and wherein the receiving of the first message indicating the location parameter associated with the wake up signal configuration is based at least in part on the transmitting of the second message.

10. A network entity for wireless communication of a non-terrestrial network, comprising:

at least one processor;

at least one memory coupled with the at least one processor; and instructions stored in the at least one memory and executable by the at least one processor to cause the network entity to:

transmit, to a user equipment (UE), a first message indicating a location parameter associated with a wake up signal configuration, wherein the location parameter comprises a cell identifier, a reference location associated with a geographic area, a radius, or any combination thereof; and transmit, to the UE, a wake up signal that corresponds to the location parameter.

11. The network entity of claim 10, wherein the geographic area associated with the wake up signal and associated with the location parameter is defined by one or more wake up signal registration areas, one or more global navigation satellite system coordinates, one or more tracking area codes (TACs), one or more virtual cell identifiers, one or more zone identifiers, one or more geo-fencing parameters, or any combination thereof.

12. The network entity of claim 11, wherein the one or more wake up signal registration areas each comprise one or more second tracking area codes (TACs), or one or more second virtual cell identifiers, one or more second zone identifiers, one more second cell identities, or any combination thereof.

13. The network entity of claim 10, wherein the instructions are further executable by the at least one processor to cause the network entity to:

transmit, to the UE, a selection parameter that corresponds to a geographic area associated with the location parameter and that indicates a set of resources used by the wake up signal, the wake up signal configuration comprising the set of resources.

14. The network entity of claim 10, wherein the instructions are further executable by the at least one processor to cause the network entity to:

transmit, to the UE, a selection parameter that corresponds to a geographic area associated with the location parameter and that indicates a signal group identity used by the wake up signal.

15. The network entity of claim 10, wherein the instructions are further executable by the at least one processor to cause the network entity to:

receive, from the UE, a second message indicating one or more preferences for a geographic area associated with the wake up signal and associated with the location parameter, a capability to use the geographic area, location information, or any combination thereof, wherein the transmitting of the first message indicating the location parameter associated with the wake up signal configuration is based at least in part on the receiving of the second message.

16. A user equipment (UE) for wireless communication, comprising:

at least one processor;

at least one memory coupled with the at least one processor; and instructions stored in the at least one memory and executable by the at least one processor to cause the UE to:

receive, from a first network entity of a non-terrestrial network, a first message indicating a first wake up signal configuration that indicates that the UE is assigned a wake up signal group identity, wherein the wake up signal group identity is associated with a geographic area; and monitor for a first wake up signal from the first network entity based at least in part on the wake up signal group identity included in the first message, wherein a first wake up signal group corresponds to the first wake up signal configuration.

17. The UE of claim 16, wherein the instructions are further executable by the at least one processor to cause the UE to:

receive, from the first network entity, a second message indicating that the first network entity uses the first wake up signal group to alert UEs in the geographic area, wherein the monitoring for the first wake up signal is based at least in part on the receiving the second message, wherein the second message is received in a broadcast message.

18. The UE of claim 16, wherein the instructions are further executable by the at least one processor to cause the UE to:

receive, from a second network entity of the non-terrestrial network, a second message indicating that the second network entity uses the first wake up signal configuration to alert UEs; and monitor for a second wake up signal group identity from the second network entity based at least in part on the first wake up signal configuration included in the second message, wherein the second wake up signal group identity corresponds to the first wake up signal configuration.

19. The UE of claim 16, wherein the instructions are further executable by the at least one processor to cause the UE to:

monitor for a second wake up signal from the first network entity based at least in part on a second wake up signal configuration that is independent of the geographic area.

20. The UE of claim 16, wherein the instructions are further executable by the at least one processor to cause the UE to:

receive, from the first network entity, a selection parameter that corresponds to the geographic area and indicates a set of resources used by the first wake up signal, the first wake up signal configuration comprising the set of resources wherein the first wake up signal is monitored via the set of resources based at least in part on the selection parameter.

21. The UE of claim 16, wherein the instructions are further executable by the at least one processor to cause the UE to:

receive, from the first network entity, a selection parameter that corresponds to the geographic area and indicates a signal group identity used by the first wake up signal wherein the first wake up signal is monitored via the signal group identity based at least in part on the selection parameter.

22. The UE of claim 16, wherein the instructions are further executable by the at least one processor to cause the UE to:

transmit, to a network device of a network, a second message indicating one or more preferences for the geographic area associated with the first wake up signal, a capability to use the geographic area associated with the first wake up signal, location information, or any combination thereof, wherein the network comprises the non-terrestrial network, and wherein the receiving of the first message indicating that the UE is assigned the first wake up signal configuration that corresponds to the geographic area is based at least in part on the transmitting of the second message.

23. A network entity for wireless communication of a non-terrestrial network, comprising:

at least one processor;

at least one memory coupled with the at least one processor; and instructions stored in the at least one memory and executable by the at least one processor to cause the network entity to:

transmit, to a user equipment (UE), a first message indicating a first wake up signal configuration that indicates that the UE is assigned a wake up signal group identity, wherein the wake up signal group identity is associated with a geographic area; and transmit, to the UE, a first wake up signal to alert the UE of a mobile terminated paging call, wherein a first wake up signal group corresponds to the first wake up signal configuration.

24. The network entity of claim 23, wherein the instructions are further executable by the at least one processor to cause the network entity to:

transmit, to the UE, a second message indicating that the network entity uses the first wake up signal group to alert UEs in the geographic area, wherein the second message is transmitted in a broadcast message.

25. The network entity of claim 24, wherein the transmitting the second message indicating that the network entity uses the first wake up signal configuration to alert UEs in the geographic area is based at least in part on the network entity being located above the geographic area.

26. The network entity of claim 23, wherein the instructions are further executable by the at least one processor to cause the network entity to:

transmit, to the UE, a second wake up signal corresponding to a second wake up signal configuration that is independent of the geographic area.

27. The network entity of claim 23, wherein the instructions are further executable by the at least one processor to cause the network entity to:

transmit, to the UE, a first selection parameter that indicates a set of resources used by the first wake up signal, a second selection parameter that indicates a signal group identity used by the first wake up signal, or both, the first selection parameter and the second selection parameter corresponding to the geographic area.

28. The network entity of claim 23, wherein the geographic area associated with the first wake up signal is defined by one or more wake up signal registration areas, one or more global navigation satellite system coordinates, one or more tracking area codes (TACs), one or more virtual cell identifiers, one or more zone identifiers, one or more geo-fencing parameters, or any combination thereof.

29. The network entity of claim 23, wherein the instructions are further executable by the at least one processor to cause the network entity to:

receive, from the UE, a second message indicating one or more preferences for the geographic area associated with the first wake up signal, a capability to use the geographic area associated with the first wake up signal, location information, or any combination thereof, wherein the transmitting of the first message indicating that the UE is assigned the first wake up signal configuration that corresponds to the geographic area is based at least in part on the receiving of the second message.

30. The network entity of claim 23, wherein the instructions are further executable by the at least one processor to cause the network entity to:

receive, from the UE, a second message indicating one or more preferences for the geographic area associated with the first wake up signal, a capability to use the geographic area associated with the first wake up signal, location information, or any combination thereof, wherein the transmitting of the first message indicating that the UE is assigned the first wake up signal configuration that corresponds to the geographic area is based at least in part on the receiving of the second message.

* * * * *